(12) United States Patent
Branca

(10) Patent No.: US 9,479,052 B2
(45) Date of Patent: Oct. 25, 2016

(54) INDEPENDENT OUTPUT CONTROL FOR SINGLE-INDUCTOR, BIPOLAR OUTPUTS, BUCK-BOOST CONVERTERS

(71) Applicant: ST-Ericsson SA, Plan-les-Ouates (CH)

(72) Inventor: Xavier Branca, Grenoble (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/428,034

(22) PCT Filed: Oct. 9, 2013

(86) PCT No.: PCT/EP2013/071022
§ 371 (c)(1),
(2) Date: Mar. 13, 2015

(87) PCT Pub. No.: WO2014/056970
PCT Pub. Date: Apr. 17, 2014

(65) Prior Publication Data
US 2015/0236588 A1     Aug. 20, 2015

Related U.S. Application Data

(60) Provisional application No. 61/727,480, filed on Nov. 16, 2012.

(30) Foreign Application Priority Data

Oct. 12, 2012   (EP) .................................... 12306263

(51) Int. Cl.
*H02M 3/158*   (2006.01)
(52) U.S. Cl.
CPC .................................. *H02M 3/158* (2013.01)

(58) Field of Classification Search
CPC ........ H02M 1/08; H02M 1/10; H02M 1/425; H02M 2001/009
See application file for complete search history.

(56) References Cited

U.S. PATENT DOCUMENTS 5,196,995 A * 3/1993 Gulczynski ........... H02M 3/158
                                                                 323/224
6,002,603 A * 12/1999 Carver .................. H02M 3/158
                                                                 363/132

(Continued)

FOREIGN PATENT DOCUMENTS

WO      2012/032176 A1      3/2012

OTHER PUBLICATIONS

International Search Report issued in corresponding International application No. PCT/EP2013/071022, date of mailing of report Oct. 29, 2013.

(Continued)

*Primary Examiner* — Timothy J Dole
*Assistant Examiner* — Yusef Ahmed
(74) *Attorney, Agent, or Firm* — Patent Portfolio Builders PLLC

(57) ABSTRACT

Methods and apparatuses drive a Single Inductor Bipolar Output Buck-Boost configured to provide both positive output voltage and a negative output voltage. The power stage is driven so that an amount of energy to be accumulated during a charging phase is controlled via the duty cycle of a first control signal, and an amount of energy to be discharged during an independent discharging phase in a buck-type or boost-type is controlled via the duty cycle of a second control signal.

18 Claims, 10 Drawing Sheets

(56) References Cited

U.S. PATENT DOCUMENTS

| | | | |
|---|---|---|---|
| 6,522,110 B1* | 2/2003 | Ivanov | G05F 1/577 307/39 |
| 7,952,900 B2* | 5/2011 | Tomiyoshi | H02M 3/1582 363/132 |
| 8,446,133 B2* | 5/2013 | Kuan | H02M 3/1582 323/271 |
| 8,860,387 B2* | 10/2014 | Kobayashi | H02M 3/1582 323/259 |
| 2002/0101745 A1* | 8/2002 | Seki | H02M 1/083 363/65 |
| 2004/0135562 A1* | 7/2004 | Oden | H02M 3/158 323/282 |
| 2004/0201281 A1* | 10/2004 | Ma | H02M 3/158 307/38 |
| 2005/0105227 A1* | 5/2005 | Chen | H02M 3/1588 361/82 |
| 2005/0110471 A1* | 5/2005 | Mayega | H02M 3/156 323/267 |
| 2005/0195626 A1* | 9/2005 | Huang | H02M 1/425 363/132 |
| 2005/0264271 A1* | 12/2005 | Lam | H02M 1/10 323/282 |
| 2007/0262759 A1* | 11/2007 | Burton | H02M 3/1584 323/272 |
| 2008/0055946 A1* | 3/2008 | Lesso | H02M 3/158 363/63 |
| 2008/0297128 A1* | 12/2008 | Xu | H02M 3/156 323/282 |
| 2008/0315850 A1* | 12/2008 | Nishida | H02M 3/157 323/284 |
| 2009/0051333 A1* | 2/2009 | Jo | H03K 17/0406 323/235 |
| 2009/0195267 A1* | 8/2009 | Ho | H03K 17/102 326/68 |
| 2009/0237062 A1* | 9/2009 | Tai | H01L 27/0744 323/311 |
| 2010/0002473 A1* | 1/2010 | Williams | H02M 3/158 363/21.06 |
| 2010/0039080 A1* | 2/2010 | Schoenbauer | H02M 3/1582 323/234 |
| 2010/0039086 A1* | 2/2010 | De Stegge | H02M 3/1582 323/282 |
| 2010/0194359 A1* | 8/2010 | Notman | H02M 3/1588 323/267 |
| 2011/0089915 A1* | 4/2011 | Qiu | H02M 3/156 323/271 |
| 2011/0089917 A1* | 4/2011 | Chen | H02M 3/1584 323/282 |
| 2012/0032644 A1* | 2/2012 | Hagiwara | H01M 10/0525 320/134 |
| 2012/0032664 A1 | 2/2012 | Coleman et al. | |
| 2012/0043947 A1* | 2/2012 | Wilson | H02M 3/1582 323/234 |
| 2012/0139509 A1* | 6/2012 | Hunt | H02M 3/156 323/234 |
| 2012/0235976 A1* | 9/2012 | Van Lier | G09G 3/3466 345/212 |
| 2012/0286576 A1* | 11/2012 | Jing | H02M 3/156 307/43 |
| 2012/0326691 A1* | 12/2012 | Kuan | H02M 3/158 323/299 |
| 2013/0026835 A1* | 1/2013 | Ghosh | H02J 9/062 307/66 |
| 2013/0141070 A1* | 6/2013 | Goessling | H02M 3/156 323/284 |
| 2013/0154591 A1* | 6/2013 | Branca | H02M 3/158 323/271 |
| 2014/0145700 A1* | 5/2014 | Branca | H03K 17/102 323/311 |
| 2014/0218117 A1* | 8/2014 | Branca | H02M 3/156 330/297 |
| 2014/0232359 A1* | 8/2014 | Dash | H02M 3/158 323/235 |
| 2015/0236594 A1* | 8/2015 | Branca | H02M 3/1582 345/213 |

OTHER PUBLICATIONS

Extended European Search Report issued in corresponding European application No. EP 12 30 6263, date of completion of the search Mar. 11, 2013.

Wei-Chung, Chen et al., A Single-Inductor Bipolar-Output Converter with 5mV Positive Voltage Ripple for Active Matrix OLED, Energy Conversion Congress and Exposition (ECCE), Sep. 2011, pp. 3229-3233.

Texas Instruments, TPS65136, "A Single Inductor Multiple Output Regulator for AMOLED," http://www.ti.com/lit/ds/symlink/tps65136.pdf (849 KB). Jul. 7, 2008.

* cited by examiner

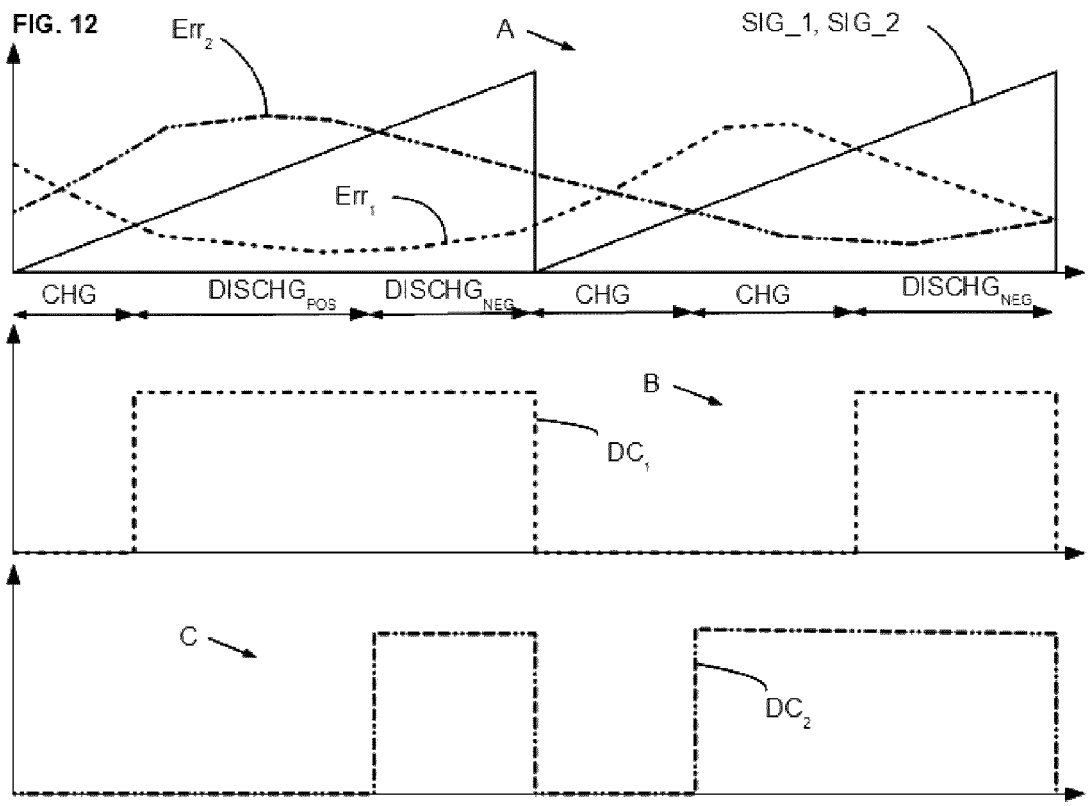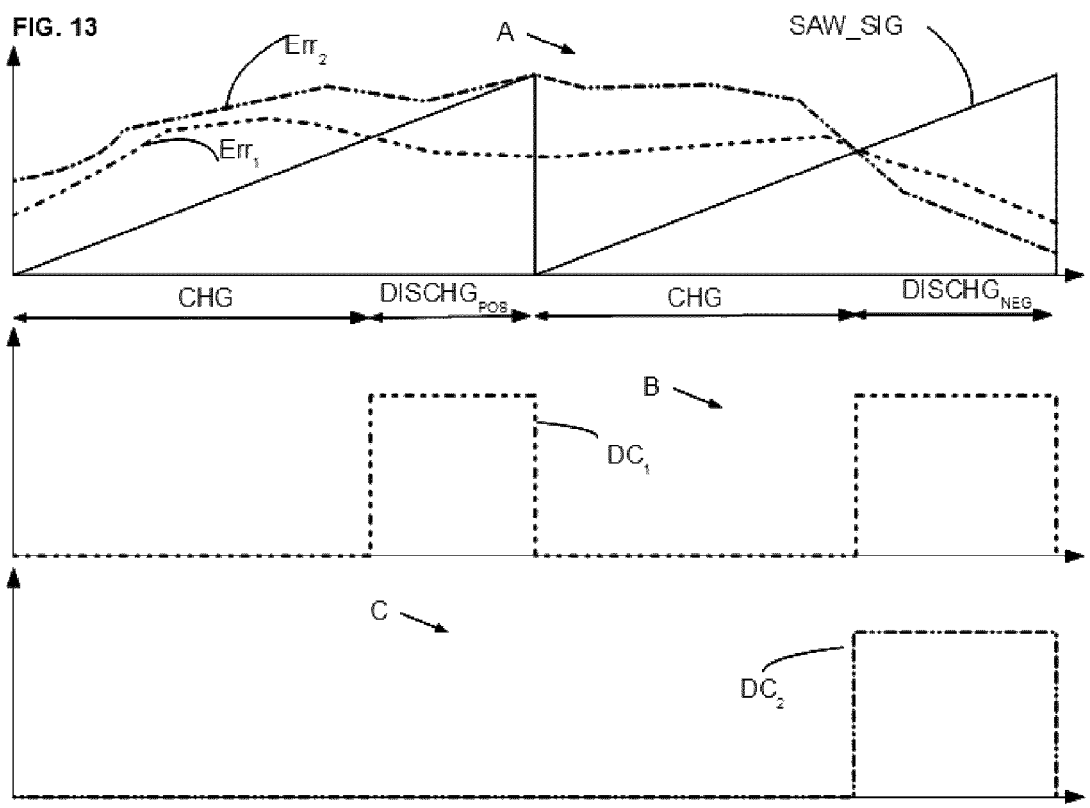

INDEPENDENT OUTPUT CONTROL FOR SINGLE-INDUCTOR, BIPOLAR OUTPUTS, BUCK-BOOST CONVERTERS

TECHNICAL FIELD

The proposed solution relates generally to Single Inductor Bipolar Output (SIBO) converters, and more especially to a method and an apparatus for controlling operation of such converters.

BACKGROUND ART

Portable devices such as smartphones, tablets, console games or e-book readers, usually utilise multiple supply voltages to power up different internal modules.

Some applications require bipolar power supplies with different regulated voltages, meaning that both positive voltage and negative voltage are needed.

Audio module and display panel are some of examples compliant with the foregoing.

For instance, Active Matrix Organic Light Emitting Diodes (AMOLED) display panel, which is a good candidate for portable devices due to its high display quality (i.e. brightness, contrast, vividness and wide viewing angle) and low power consumption requires the supply of both a positive voltage and a negative voltage to operate properly.

A power converter such as a Single Inductor Bipolar Output (SIBO) converter may be used to provide such positive and a negative power supply.

However, most of SIBO converters are exclusively operated in a boost type (SIBO-Boost) configuration, meaning that an input voltage can only be stepped-up to produce a higher positive output voltage, or in a buck type (SIBO-Buck) configuration, meaning that an input voltage can only be stepped-down to produce a lower positive output voltage, but not both.

This is inappropriate for newest technologies of Organic Light Emitting Diodes (OLED), which requires a positive supply voltage that can be either higher or lower than the classical Li-Ion battery voltage and thus requires a voltage converter able to operate either in Buck or Boost mode.

Therefore, an appropriate SIBO converter should be able to operate both as a SIBO-buck and as a SIBO-boost in a controllable manner, thus corresponding to a SIBO-Buck-Boost (SIBOBB), for both a positive output voltage and a negative output voltage. In this case, it would be possible to step-up or step-down an input voltage when needed to produce a positive output voltage or a negative output voltage.

A converter addressing that kind of requirements is proposed in document (1): WEI-CHUNG, Chen, et al. A single-inductor bipolar-output converter with 5 mV positive voltage ripple for active matrix OLED. *Energy Conversion Congress and Exposition (ECCE)*. Sep. 2011, p. 3229-3233.

Nevertheless, the converter of document (1) is not able to operate as a SIBO-buck for the positive output.

Another interesting converter is proposed in document (2): TEXAS INSTRUMENTS, TPS65136. Single Inductor Multiple Output Regulator for AMOLED. http://www.ti-.com/lit/ds/symlink/tps65136.pdf (849 KB). 7 Jul. 2008.

However, the converter of document (2) is not able to operate properly with stability if the load current asymmetry between the negative output current and the positive output current is greater than 30%, meaning that the difference in current at each output needs to stay in close range.

To summarize, the control of a SIBO-Buck-Boost converter adapted to generate required positive output voltage and negative output voltage is not adequately addressed by known techniques.

A possible controller that might be used to solve the above problem is described in document (3) WO2012/032176 wherein it is disclosed a power stage that might be adapted to output a positive output voltage and a negative output voltage. While working satisfactorily, the solution described in document (3) may still be improved to better meet the ever increasing requirements of wireless applications.

SUMMARY OF INVENTION

Thus, an objective of the proposed solution is to overcome or at least attenuate the above problem by controlling a Single Inductor Bipolar Output Buck-Boost (SIBOBB) converter using a conduction cycle of the operations of the SIBOBB converter in such a way as to act in a buck-type or boost-type configuration, in a controllable manner for each output, during a clock cycle period.

A first aspect of the proposed solution relates to a method of driving a Single Inductor Bipolar Output Buck-Boost, SIBOBB, clocked by a clock signal having a given clock cycle period, the SIBOBB comprising at least five power switches and at least one positive output adapted to output a positive output voltage and at least one negative output adapted to output a negative output voltage. The method comprising the following steps performed during the clock cycle period: generating a first control signal based on, at least, the positive output voltage and a positive reference voltage; generating a second control signal based on, at least, the negative output voltage and a negative reference voltage; initiating a charging phase of the SIBOBB, based on a monitoring of the first control signal, during which an amount of energy to be accumulated by the SIBOBB is controlled by a first duty cycle of the first control signal; initiating a first discharging phase of discharging the energy accumulated in the SIBOBB to at least one of the positive output and the negative output in a buck-type or boost-type configuration of the SIBOBB, based on a simultaneous monitoring of the first control signal and the second control signal, during which first discharging phase, an amount of energy to be discharged by the SIBOBB is controlled by a second duty cycle of the second control signal; and, wherein the charging phase is initiated before the first discharging phase.

A second aspect relates to an apparatus for driving a Single Inductor Bipolar Output Buck-Boost, SIBOBB, clocked by a clock signal having a given clock cycle period, the SIBOBB comprising at least five power switches and at least one positive output adapted to output a positive output voltage and at least one negative output adapted to output a negative output voltage, the apparatus comprising:

means for generating a first control signal configured to be based on, at least, the negative output voltage and a negative reference voltage;

means for generating a second control signal configured to be based on, at least, the positive output voltage and a positive reference voltage;

means for initiating a charging phase of the SIBOBB, configured to be based on a monitoring of the first control signal, during which an amount of energy to be accumulated by the SIBOBB is controlled by a first duty cycle of the first control signal;

means for initiating a first discharging phase of discharging the energy accumulated in the SIBOBB to at least one of the positive output and the negative output in a buck-type or boost-type configuration of the SIBOBB, configured to be based on a simultaneous monitoring of the first control signal and the second control signal, during which first discharging phase, an amount of energy to be discharged by the SIBOBB is controlled by a second duty cycle of the second control signal; and, wherein, means for initiating the charging phase are activated before the activation of means for initiating the first discharging phase.

A third aspect relates to a display integrated circuit comprising:
- a display panel;
- a Single Inductor Bipolar Output Buck-Boost converter (SIBOBB);
- a processor; and,
- an apparatus as defined in the second aspect of the proposed solution, wherein the display panel and the apparatus are controlled by the processor, the display panel is powered by the SIBOBB and the SIBOBB is controlled by the apparatus.

A fourth aspect relates to wireless device comprising the display integrated circuit as defined in third aspect of the proposed solution.

Examples of such wireless devices include, for instance, portable phones, smartphones, tablets, console games, e-book readers, portable audio and/or video players, etc.

Thus in a wireless device embodying the principles of such mechanism, weaknesses of prior art regarding SIBOBB regulation in order to enable independent buck-type or boost-type conversion on each of its output during a clock cycle are overcome.

Also, with the proposed solution, full load current asymmetry between the negative output current and the positive output current may be supported with a single charge of the inductor of the SIBOBB.

In other words, embodiments offer proper solutions for cases as presented in the introduction.

In one embodiment, generating the first control signal is further based on the negative output voltage and generating the second control signal is further based on the positive output voltage.

In another embodiment, there is further provided the generating a third control signal based on, at least, the first control signal and the second control signal; initiating a second discharging phase of discharging the energy accumulated in the SIBOBB simultaneously to both the positive output and the negative output in a buck-type or boost-type configuration of the SIBOBB, based on a monitoring of the first control signal, the second control signal and the third control signal simultaneously, during which second discharging phase, an amount of energy to be discharged by the SIBOBB is controlled by a second duty cycle of the second control signal and a third duty cycle of the third control signal; and, wherein the charging phase is initiated before the second discharging phase.

In one other embodiment, the first discharging phase comprises discharging the accumulated energy in both the positive output and the negative output sequentially, the discharging of the accumulated energy to the positive output being initiated before the discharging of the accumulated energy to the negative output.

In yet another embodiment, the first discharging phase comprises discharging the accumulated energy in both the positive output and the negative output sequentially, the discharging of the accumulated energy to the positive output being initiated after the discharging of the accumulated energy to the positive output.

In still another embodiment, the second discharging phase comprises discharging the accumulated energy in both the positive output and the negative output simultaneously, and wherein initiating the second discharging phase is performed before the first discharging phase.

In yet another embodiment, the second discharging phase comprises discharging the accumulated energy in both the positive output and the negative output simultaneously, and wherein initiating the second discharging phase is performed after the first discharging phase.

If desired, the first, second and third control signals are generated by a Pulse Width Modulation, PWM, modulator based on respective comparison signals, wherein at least some of the comparison signals are saw-tooth signals or triangular signals.

In one embodiment, generating the first control signal is performed by inputting into the PWM modulator the first comparison signal and a first error signal proportional to the voltage difference between the positive output voltage and the positive reference voltage.

In another embodiment, generating the second control signal is performed by inputting into the PWM modulator, the second comparison signal and a second error signal proportional to the voltage difference between the negative output voltage and the negative reference voltage.

In yet another embodiment, generating the first control signal is performed by inputting into the PWM modulator, the first comparison signal and a first error signal corresponding to a voltage difference between a sum reference voltage and a voltage sum of positive output voltage and negative output voltage.

In still another embodiment, generating the second control signal is performed by inputting into the PWM modulator, the second comparison signal and a second error signal corresponding to a voltage difference between a difference reference voltage and a voltage difference between positive output voltage and the negative output voltage.

In yet another embodiment, generating the third control signal is performed by inputting into the PWM modulator, a third error signal corresponding to a voltage difference between the first error signal and the second error signal.

BRIEF DESCRIPTION OF DRAWINGS

A more complete understanding of the proposed solution may be obtained from a consideration of the following description in conjunction with the drawings, in which like reference numbers indicate the same or similar element, in FIG. 1 and FIGS. 7 to 14 in a first place and in FIGS. 2 to 6 in a second place and in which:

FIG. 12 is a diagram illustrating an embodiment a conduction cycle according to the proposed solution.

FIG. 13 is a diagram illustrating another embodiment a conduction cycle according to the proposed solution.

DESCRIPTION OF EMBODIMENTS

Figure 1:
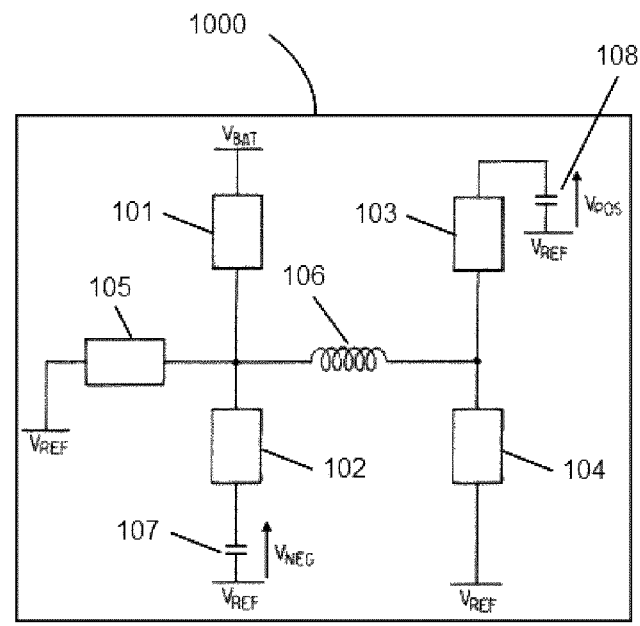
FIG. 1 is a block diagram illustrating an embodiment of a SIBO-Buck-Boost converter.

FIG. 1 is a block diagram illustrating an embodiment of a SIBOBB 1000, wherein SIBOBB 1000 is clocked by a clock signal (not shown) having a clock cycle period and comprising five power switches 101, 102, 103, 104, 105, one power inductor 106 and two capacitors 107, 108.

SIBOBB 1000 is adapted to supply a positive output voltage $V_{POS}$ and a negative output voltage $V_{NEG}$ from an input voltage $V_{BAT}$.

$V_{REF}$ corresponds to a reference potential common to the entire SIBOBB 1000, commonly referred to as the ground with a value generally equal to 0 volts.

A possible embodiment of SIBOBB 1000 is described, for instance, as a power stage in document (3) WO2012/032176.

For the sake of clarity and completeness, it appears necessary to present the structure of the power stage of document (3) WO2012/032176 since essential elements therein might be manipulated to achieve the above objectives.

Figure 5:
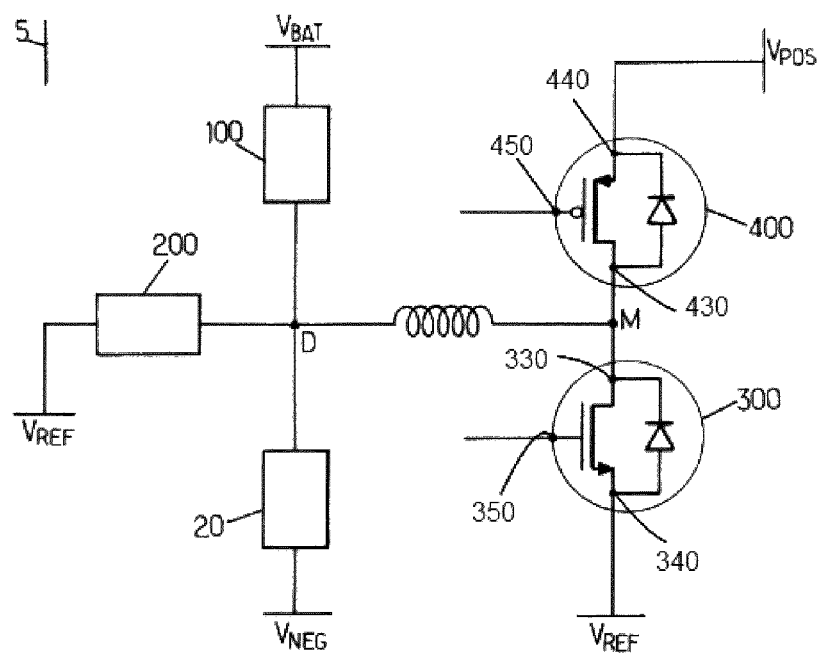
FIG. 5 is a block diagram of an electrical circuit of a power stage according to one embodiment.
Figure 6:
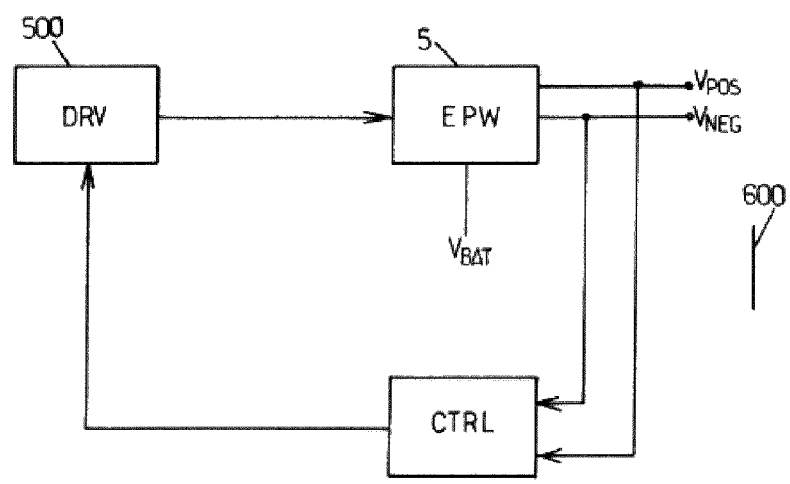
FIG. 6 is a schematic diagram of a power supply according to one embodiment.
Figure 7:
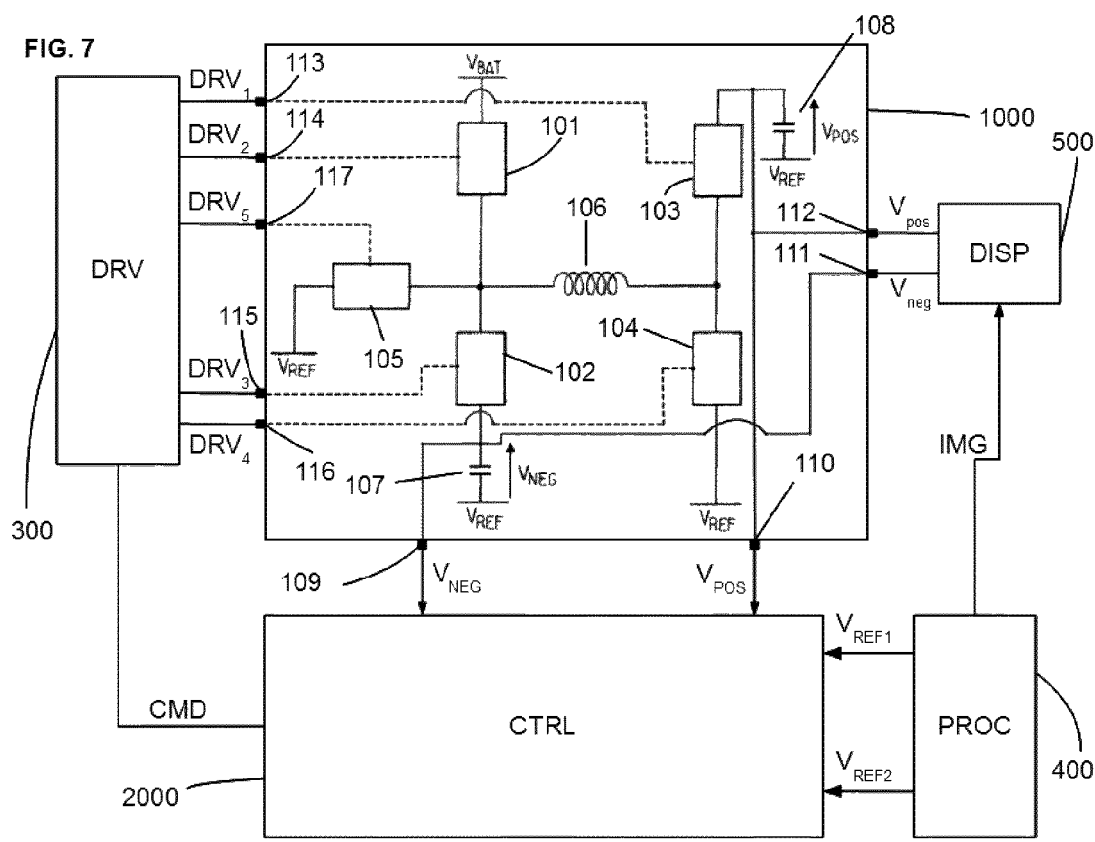
FIG. 7 is a block diagram illustrating an embodiment of the proposed solution.

Therefore, FIGS. 2 to 6 will be used to describe such power stage, and then, starting from the description of FIG. 7, the proposed solution to the above problem will be presented.

Figure 2:
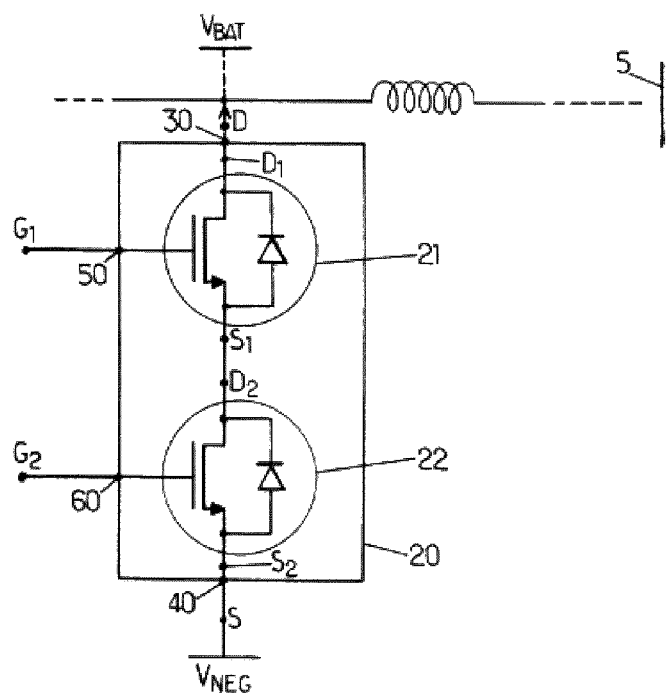
FIG. 2 is a schematic diagram representing a controlled switch according to one embodiment, included in a section of an electrical circuit of a power stage.

One embodiment of a controlled switch 20, included in a section of an electrical circuit 5 of FIG. 5, of a power stage, is diagrammatically represented in FIG. 2. The switch 20 comprises a first coupling node 30 and a second coupling node 40. The switch 20 also comprises at least a first control input 50 and a second control input 60. The switch 20 is adapted to open or close an electrical circuit between the first coupling node 30 and the second coupling node 40, as a function of the control voltages received on the first input 50 and the second input 60. In the example in FIG. 2, the first coupling point 30 is coupled to a node D of the circuit 5, and the second coupling point 40 to a node S of the circuit 5. The voltage at the node S is equal to a voltage $V_{NEG}$.

The switch 20 comprises cascode connected first transistor 21 and second transistor 22 connected. The first and second transistors 21 and 22 may be metal-oxide-semiconductor transistors, more commonly referred to as (MOS) transistors, each comprising a gate, a drain, and a source. In the example in FIG. 2, the first and second transistors are N-channel MOS transistors, more commonly referred to as NMOS transistors.

The first transistor 21 is conducting, meaning that it allows current to pass between its drain and its source, when the difference in potential $V_{GS}$ between its gate and its source is greater than a first threshold $V_{TH1}$. Otherwise, meaning if $V_{GS}<V_{TH1}$, the first transistor 21 is blocked, that is to say non-conducting. The second transistor 22 is conducting, meaning that it allows current to pass between its drain and its source, when the difference in potential $V_{GS}$ between its gate and its source is greater than a second threshold $V_{TH2}$. Otherwise, meaning if $V_{GS}<V_{TH2}$, the second transistor 22 is non-conducting.

The first transistor 21 is placed in the switch 20 so that its gate is coupled to the first input 50, its drain is coupled to the first coupling node 30, and its source is coupled to the drain of the second transistor 22. The second transistor 22 is placed in the switch 20 so that its gate is coupled to the second input 60, its drain to the source of the first transistor 21, and its source to the second coupling node 40.

The switch 20 is adapted to be controlled by a first control voltage $T_1$ received on the first input 50, and by a second control voltage $T_2$ received on the second input 60. The value $V_1$ of the first control voltage $T_1$ is less than that of the voltage $V_{BAT}$ and greater than that of the voltage $V_{NEG}$. The value $V_1$ of the first control voltage $T_1$ is substantially constant.

The second control voltage $T_2$ can substantially assume two values:
a first value $V_{21}$ which is substantially equal to the value $V_1$ of the first control voltage $T_1$
a second value $V_{22}$ which is less than the value $V_1$ of the first control voltage $T_1$ and equal to that of the voltage $V_{NEG}$.

The second transistor 22 is configured in the circuit so as to be:
conducting when the second control voltage has a value substantially equal to the first value $V_{21}$; and,
non-conducting when the second control voltage has a value substantially equal to the second value $V_{22}$.

To close the switch 20, and therefore allow current to flow between the first and second coupling nodes, the control voltage T2 is applied to the second input 60 while ensuring that the value of said control voltage is equal to the value $V_{21}$. The difference in potential $V_{GS}$ between the gate and the source of the second transistor 22 is then equal to the difference between the value $V_1$ and the value of the voltage $V_{NEG}$, and this difference in potential $V_{GS}$ is greater than the threshold $V_{TH2}$. Conversely, in order to open the switch 20 and therefore prevent current from flowing between the first and second coupling nodes, the control voltage $T_2$ is applied to the second input 60 while ensuring that the value of said control voltage is equal to the value $V_{22}$. Whether the switch 20 is closed or open, the value of the first control voltage $T_1$ is maintained at the value $V_1$. The difference in potential $V_{GS}$ between the gate and the source of the second transistor 22 is then substantially zero and less than the threshold $V_{TH2}$.

In one embodiment, the circuit 5 is used to supply a positive voltage $V_{POS}$ and a negative voltage $V_{NEG}$, from the voltage $V_{BAT}$. The switch 20 is then coupled to the circuit so that the first input 50 receives the reference voltage $V_{REF}$, and the second input 60 receives either the reference voltage $V_{REF}$ or the negative voltage $V_{NEG}$, depending on whether the switch is to be closed or open.

As a non-limiting example, the voltage $V_{BAT}$ is supplied by a battery, at a value substantially equal to 4.8V. The positive voltage $V_{POS}$ and the negative voltage $V_{NEG}$ can be symmetrical voltages or dissymmetrical voltages possibly comprised in a range of [1.5V; 4.8V] and [−1.5V; −4.8V] respectively. The values $V_1$ and $V_{21}$ are equal to the reference voltage $V_{REF}$, which is 0V. The value $V_{22}$ is equal to the negative voltage $V_{NEG}$, which is possibly comprised in the range [−1.5V; −4.8V]. When the switch 20 is open, the difference in potential between the first and second coupling nodes can be therefore substantially equal to 9.6V. The voltage $V_{GS}$ between the gate and the source of the first transistor 21 is then zero, because the current between the first and second coupling nodes is zero. As a result, the voltage at the drain of the second transistor 22 is equal to $V_1$, which is 0V. The first and second transistors can therefore be designed and manufactured to support a maximum difference in potential of only 4.8V.

Figure 3:
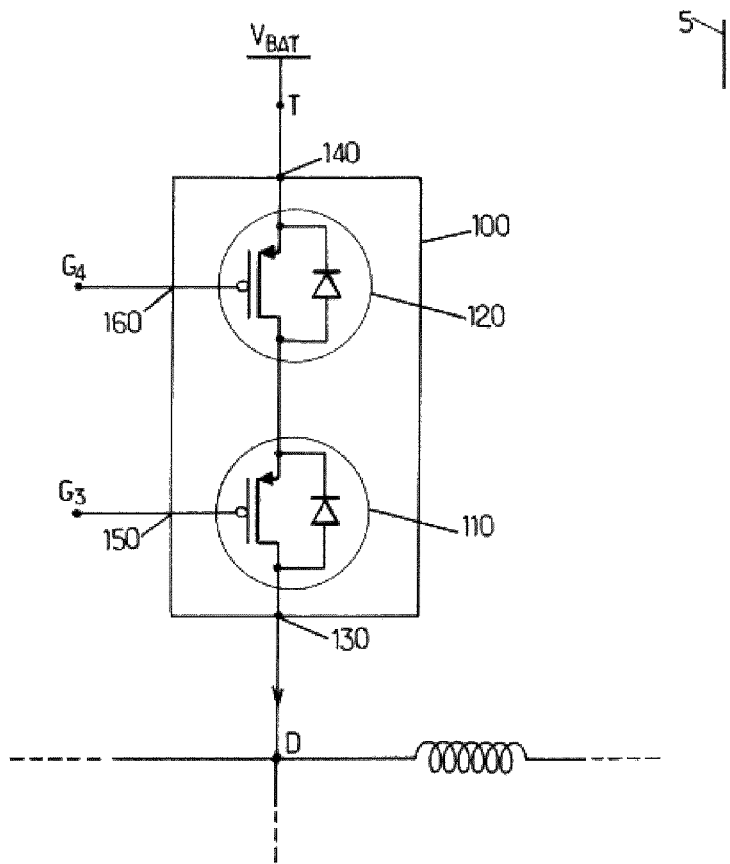
FIG. 3 is a schematic diagram representing a controlled switch according to another embodiment, included in another section of the electrical circuit.

A controlled switch 100 according to another embodiment, and which may be included in a section of the electrical circuit 5, is represented in FIG. 3. The switch 100 comprises a first coupling node 130 and a second coupling node 140. The switch 100 also comprises at least a first control input 150 and a second control input 160. The switch 100 is adapted to open or close an electrical circuit between the first coupling node 130 and the second coupling node 140, as a function of the control voltages received in particular on the first input 150 and the second input 160. In the example in FIG. 3, the first coupling point 130 is coupled to the node D, and the second coupling point 140 to the node T. The voltage at the node T is equal to the voltage $V_{BAT}$.

The switch 100 as shown comprises cascode connected first transistor 110 and a second transistor 120. The first and second transistors are typically metal-oxide-semiconductor transistors, more commonly referred to as MOS transistors, each comprising a gate, a drain, and a source. More particularly, in the example in FIG. 3, the first and second transistors are P-channel MOS transistors or PMOS transistors.

The first transistor 110 is conducting, meaning that it allows current to pass between its drain and its source, when the difference in potential $V_{GS}$ between its gate and its source is less than a threshold $V_{TH3}$. Otherwise, meaning if $V_{GS} > VTH_3$, the first transistor 110 is non-conducting. The second transistor 120 is conducting, meaning it allows current to pass between its drain and its source, when the difference in potential $V_{GS}$ between its gate and its source is less than a threshold $V_{TH4}$. Otherwise, meaning if $V_{GS} > V_{TH4}$, the second transistor 120 is non-conducting.

The first transistor 110 is placed in the switch 100 so that its gate is coupled to the first input 150, its drain to the first coupling node 130, and its source to the drain of the second transistor 120. The second transistor 120 is placed in the switch 100 so that its gate is coupled to the second input 160, its drain to the source of the first transistor 110, and its source to the second coupling node 140.

The switch 100 is adapted to be controlled by a first control voltage $T_3$ received on the first input 150, and by a second control voltage $T_4$ received on the second input 160. The value $V_3$ of the first control voltage $T_3$ is less than that of the voltage $V_{BAT}$ and greater than that of the voltage $V_{NEG}$. The value $V_3$ of the first control voltage $T_3$ is substantially constant.

The second control voltage $T_4$ can substantially assume two values:
 a first value $V_{41}$ which is substantially equal to the value $V_3$ of the first control voltage $T_3$,
 a second value $V_{42}$ which is greater than the value $V_3$ of the first control voltage $T_3$ and equal to that of the voltage $V_{BAT}$.

The second transistor 120 is configured in the circuit to be:
 conducting when the second control voltage has a value substantially equal to the first value $V_{41}$,
 non-conducting when the second control voltage has a value substantially equal to the second value $V_{42}$.

Thus, to close the switch 100 and therefore allow current to flow between the first and second coupling nodes, it is sufficient to apply the control voltage $T_4$ to the second input 160 while ensuring that the value of said control voltage is equal to the value $V_{41}$. The difference in potential $V_{GS}$ between the gate and the source of the second transistor is then equal to the difference between the value $V_3$ and the voltage $V_{BAT}$, and this difference in potential $V_{GS}$ is less than the threshold $V_{TH4}$. Otherwise, to open the switch 100 and therefore prevent current from flowing between the first and the second coupling node, the control voltage $T_4$ is applied to the second input 160 while ensuring that the value of said control voltage is equal to the value $V_{42}$. The difference in potential $V_{GS}$ between the gate and the source of the second transistor is then substantially zero and greater than the threshold $V_{TH4}$. Whether the switch 20 is open or closed, the value of the first control voltage $T_3$ is maintained at the value $V_{41}$.

In one embodiment, the circuit 5 is used to supply the positive voltage $V_{POS}$ and the negative voltage $V_{NEG}$, from the voltage $V_{BAT}$. The switch 100 is then coupled to the circuit so that the first input 150 is coupled to the reference potential of the circuit 45, and the second input 160 is coupled either to the voltage $V_{BAT}$ or to the reference potential of the circuit 5, depending on whether the switch is to be closed or open.

As a non-limiting example, the voltage $V_{BAT}$ is for example supplied by a battery, and has a value substantially equal to 4.8V. The values $V_3$ and $V_{41}$ are equal to that of the reference potential, which is 0V. The value $V_{42}$ is equal to that of the voltage $V_{BAT}$, which is 4.8V. The maximum potential difference between the first and the second coupling node is therefore substantially equal to 4.8V. When the switch 100 is open, the voltage $V_{GS}$ between the gate and the source of the first transistor is also zero, because the current between the first and second coupling node is zero. As a result, the value of the voltage at the drain of the second transistor 120 is equal to the value $V_3$, which is 0V. The first and second transistor can therefore be manufactured to support a maximum potential difference of only 4.8V, when the node D is at the negative voltage $V_{NEG}$.

Figure 4A:
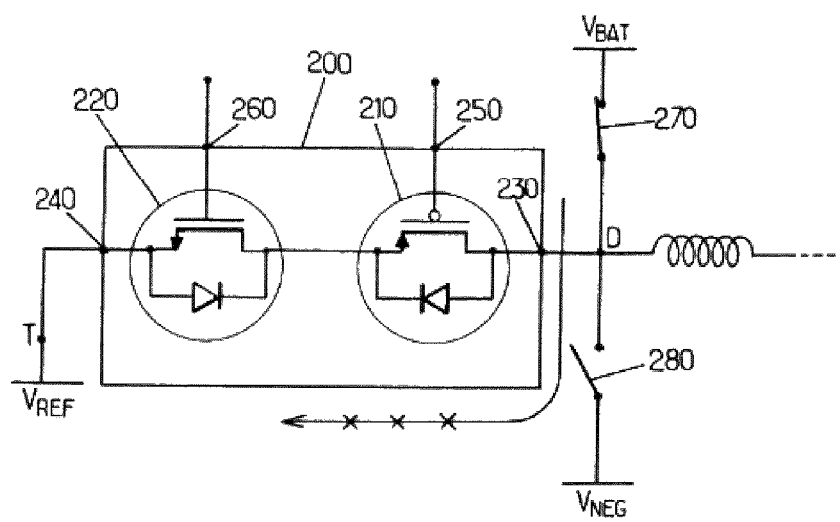
FIGS. 4-A and 4-B are schematic diagrams illustrating a controlled switch according to another embodiment, in different configurations and included in another section of the electrical circuit.
Figure 4B:
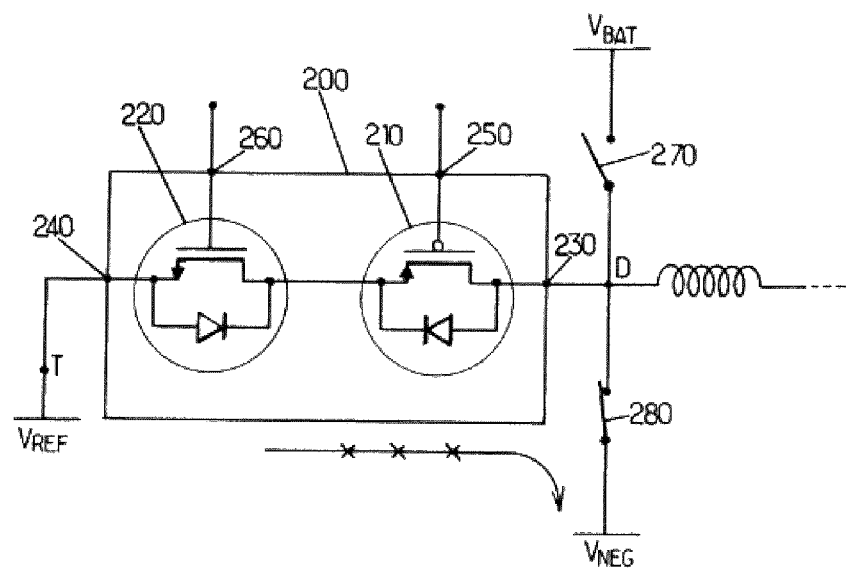

A controlled switch 200, according to one embodiment and included in a section of the electrical circuit 5, is represented in FIGS. 4a and 4b. The switch 200 comprises a first coupling node 230 and a second coupling node 240. The switch 200 also comprises at least a first control input 250 and a second control input 260. The switch 200 is adapted to open or close an electrical circuit between the first coupling node 230 and the second coupling node 240, as a function of the control voltages received in particular on the first input 250 and second input 260. In the example in FIGS.

4a and 4b, the first coupling node 230 is coupled to the node D, and the second coupling node 240 to a node T. The potential at the node T is equal to the reference potential $V_{REF}$.

The switch 200 comprises a first transistor 210 and a second transistor 220 connected in cascode. The first and second transistors are typically metal-oxide-semiconductor transistors, more commonly referred to as MOS transistors, each comprising a gate, a drain, a source, and a body diode. In the example in FIGS. 4a and 4b, the first and second transistors are N-channel MOS transistors, or NMOS transistors.

The first transistor 210 is placed in the switch 200 so that its gate is coupled to the first input 250, its drain to the first coupling node 230, its source to the drain of the second transistor 220, and the anode of the body diode to the first connection node 230. The second transistor 220 is placed in the switch 200 so that its gate is coupled to the second input 260, its drain to the source of the first transistor 210, its source to the second coupling node 240, and the anode of the body diode to the second connection node 240. The body diodes of the first and second transistors are therefore assembled face to face.

The switch 200 is adapted to be controlled by a first control voltage $T_5$ received on the first input 250, and by a second control voltage $T_6$ received on the second input 260. To open the switch 200, so that no current can flow, the value $V_5$ of the first control voltage $T_5$ is equal to that of the reference voltage $V_{REF}$, and the value $V_6$ of the second control voltage $T_6$ is equal to that of the reference voltage $V_{REF}$. To close the switch 200, so that current can flow, the value $V_5$ of the first control voltage $T_5$ is equal to that of the negative voltage $V_{NEG}$ and the value $V_6$ of the second control voltage $T_6$ is equal to the voltage $V_{BAT}$. To allow current to flow through the body diodes of the switch 200 even when the switch 200 is closed and the inductor forces current to flow from the node D to the node M, the first control voltage $T_5$ is equal to the voltage $V_{NEG}$ and the second control voltage $T_6$ is equal to the reference voltage $V_{REF}$.

The switch 300 is a transistor which is typically a metal-oxide-semiconductor transistor, more commonly referred to as MOS, comprising a gate, a drain, a source, and a body diode. In the example in FIG. 5, the transistor 300 is a N-channel MOS transistor, or NMOS transistor.

The switch 300 is arranged so that its gate is coupled to the first input 350, its drain to the first coupling node 330, its source to the second coupling node 340, and the anode of the body diode to the first coupling node 330.

The switch 300 is adapted to be controlled by a first control voltage $T_7$ received on the first input 350. To open the switch 300, so that no current can flow, the value $V_7$ of the first control voltage $T_7$ is equal to that of the reference voltage $V_{REF}$. To close the switch 300, so that current can flow, the value $V_7$ of the first control voltage $T_7$ is equal to that of the voltage $V_{BAT}$.

The switch 400 is a transistor which is typically a metal-oxide-semiconductor transistor, more commonly referred to as MOS, comprising a gate, a drain, a source, and a body diode. In the example in FIG. 5, the transistor 400 is a P-channel MOS transistor, or PMOS transistor.

The switch 400 is arranged so that its gate is coupled to the first input 450, its drain to the first coupling node 430, its source to the second coupling node 440, and the cathode of the body diode to the first coupling node 430.

The switch 400 is adapted to be controlled by a first control voltage $T_8$ received on the first input 450. To open the switch 400, so that no current can flow, the value $V_8$ of the first control voltage $T_8$ is equal to that of the voltage $V_{POS}$. To close the switch 400, so that current can flow, the value $V_8$ of the first control voltage $T_8$ is equal to that of the reference voltage $V_{REF}$.

In one embodiment, the circuit 5 is used to supply a positive voltage $V_{POS}$ and the negative voltage $V_{NEG}$, from the voltage $V_{BAT}$. The switch 200 is then coupled to the circuit so that the first input 250 is coupled to the negative voltage $V_{NEG}$ or to the reference voltage $V_{REF}$, and the second input 260 is coupled either to the reference voltage $V_{REF}$ or to the input voltage $V_{BAT}$, depending on whether current is to be prevented from flowing in the body diodes of the first and second transistors 210, 220 when the first and second transistors 210, 220 are also non-conducting.

As a non-limiting example, the voltage $V_{BAT}$ is supplied by a battery, and has a value substantially equal to 4.8V. The controlled switch 200 allows opening the circuit 5 between the nodes D and T, for any polarity of the node D. The positive voltage $V_{POS}$ and the negative voltage $V_{NEG}$ can be symmetrical voltages or dissymmetrical voltages. The value $V_5$ is equal to the negative voltage $V_{NEG}$, The value $V_6$ is equal either to the input voltage $V_{BAT}$, or to the reference voltage $V_{REF}$ 0V. Thus, to open the switch 200 when the switch 270 is closed and the switch 280 open, corresponding to the situation where the node D has a positive polarity as represented in FIG. 4a, the first control voltage $T_5$ is equal to the voltage $V_{NEG}$ and the second control voltage $T_6$ is equal to the voltage $V_{BAT}$. To open the switch 200 when the switch 270 is open and the switch 280 closed, corresponding to the situation where the node D has a negative polarity as represented in FIG. 4b, the first control voltage $T_5$ is equal to the voltage $V_{NEG}$ and the second control voltage $T_6$ is equal to the voltage $V_{REF}$. As the body diodes of the first and second transistors are assembled face to face, no leakage current can pass through the switch 200 when said switch is open.

The circuit 5 comprising the previously described switches 20, 100, and 200 can in particular be used in a power supply 600, as represented in FIGS. 5 and 6. The power supply 600 is, for example, a voltage regulating device coupled to a voltage source supplying a voltage $V_{BAT}$, for example a storage cell such as a battery. The power supply 600 is, for example, contained in a portable device such as a mobile telephone, a portable audio and/or video player, or a laptop computer. The power supply 600 comprises a power stage implemented by the circuit 5, adapted to supply a positive voltage $V_{POS}$ and a negative voltage $V_{NEG}$. The power stage is equipped with control inputs for receiving control voltages defining a control strategy for producing the negative voltage $V_{NEG}$ and the positive voltage $V_{POS}$. The power supply comprises a control circuit coupled to the power stage outputs in order to compare over time the negative $V_{NEG}$ and positive $V_{POS}$ voltages to at least one reference voltage $V_{REF}$ and to produce error signals $V_{err1}$, $V_{err2}$. The power supply comprises a driving circuit 500 coupled to the control circuit in order to receive the error signals $V_{err1}$, $V_{err2}$ and to generate the control voltages, and to the power stage in order to supply the control voltages so generated.

FIG. 7 is a block diagram illustrating an embodiment of the proposed solution comprising the SIBOBB 1000, a controller (CTRL) 200, a driver (DRV) 3000, a processor (PROC) 4000, and a display module (DISP) 500 wherein DISP 500 and DRV 3000 are controlled by PROC 4000, DISP 500 is powered by SIBOBB 1000 and SIBOBB 1000 is controlled by DRV 3000.

All foregoing elements might be embodied, for instance, in a portable device such as a smartphone, a tablet, a console game or an e-book reader.

Referring to FIG. 7, the SIBOBB 1000 comprises four output pins 109, 110, 111, 112 and five input pins 113, 114, 115, 116, 117.

Input pins 113, 114, 115, 116 and 117 are adapted to receive driving commands $DRV_2$, $DRV_3$, $DRV_1$, $DRV_4$ and $DRV_5$ from DRV 3000, and used to command power switches 101, 102, 103, 104 and 105, respectively.

DRV 3000 is configured to either turn on or turn off power switches 101, 102, 103, 104 and 105 thanks to driving commands $DRV_2$, $DRV_3$, $DRV_1$, $DRV_4$ and $DRV_5$, respectively based on one or more control commands CMD received from CTRL 2000.

One should understand that, throughout the description, when a power switch 101, 102, 103, 104, 105, is said to be "turned on" it means that corresponding switch 101, 102, 103, 104, 105 is "closed" and conducting, such that current can flow through it.

On the other hand, when a power switch 101, 102, 103, 104, 105, is said to be "turned off" it means that corresponding switch 101, 102, 103, 104, 105 is "open" and non-conducting, such that current can not flow through it.

Referring again to FIG. 7, output pins 111 and 112 are adapted to provide positive output voltage $V_{POS}$ and negative output voltage $V_{NEG}$ to DISP 500, respectively.

DISP 500 is configured to display one or more images IMG, by supplying pixels (not shown) of DISP 500 with positive output voltage $V_{POS}$ and negative output voltage $V_{NEG}$.

For instance, DISP 500 might be a Liquid Crystal Display (LCD) panel, an Organic Light Emitting Diode (OLED) display panel or an AMOLED display panel.

For instance, as well, the one or more images IMG are presented to DISP 500 by PROC 4000.

Referring again to FIG. 7, output pins 109 and 110 are adapted to provide positive output voltage $V_{POS}$ and negative output voltage $V_{NEG}$ to CTRL 2000, respectively.

CTRL 2000 is configured to control operations modes performed by SIBOBB 1000.

An operation mode is a particular task performed by SIBOBB 1000.

For instance, in an embodiment, SIBOBB 1000 can be configured to perform the following tasks:
 charging the inductor 106 current,
 discharging the inductor 106 current to a negative output 109, 111, or
 discharging the inductor 106 current to a positive output 110, 112.

These tasks can be arranged in a particular order depending on the requirements.

In the rest of the description, a series of sequential tasks performed by SIBOBB 1000 would be called a conduction cycle.

A conduction cycle is generally performed during a clock cycle period, whereby a clock cycle period is the time from a first clock signal to the end of a succession of clock signals.

In order to apply particular conduction cycle, CTRL 2000 uses one or more control commands CMD sent to DRV 3000.

Control commands CMD are based on, at least, positive output voltage $V_{POS}$, negative output voltage $V_{NEG}$, a first reference voltage $V_{REF1}$, and a second reference voltage $V_{REF2}$ or a combination of the foregoing parameters.

For instance, the first reference voltage might be a positive reference voltage or a sum reference voltage while the second reference voltage might be a negative reference voltage or a difference reference voltage.

Both, the first reference voltage $V_{REF1}$ and the second reference voltage $V_{REF2}$ are received by CTRL 2000 from PROC 4000.

PROC 4000 is configured to control the provided reference voltage $V_{REF1}$ and reference voltage $V_{REF2}$ to CTRL 2000 and is also configured to present one or more images IMG to DISP 500 so as to have them being displayed by DISP 500.

In order to overcome the weakness of prior art regarding asymmetry in load current between negative output current and positive output current, as stated before, it is proposed, in one embodiment, a conduction cycle made of at least two phases.

Figure 8A:
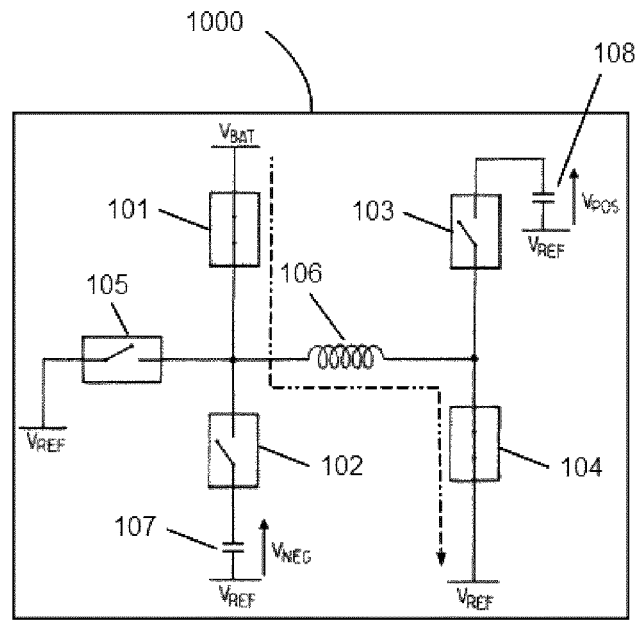
FIG. 8A is a block diagram illustrating an embodiment of a phase of a Conduction cycle according to the proposed solution.
Figure 8B:
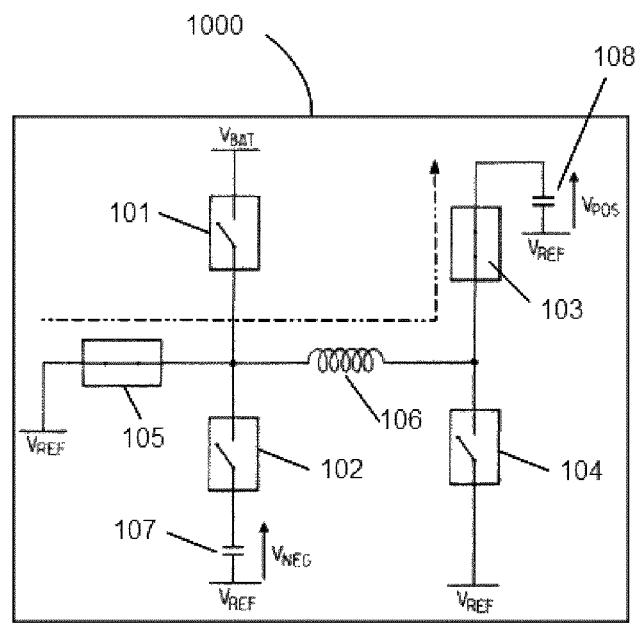
FIG. 8B is a block diagram illustrating an embodiment of another phase of a conduction cycle according to the proposed solution.
Figure 8C:
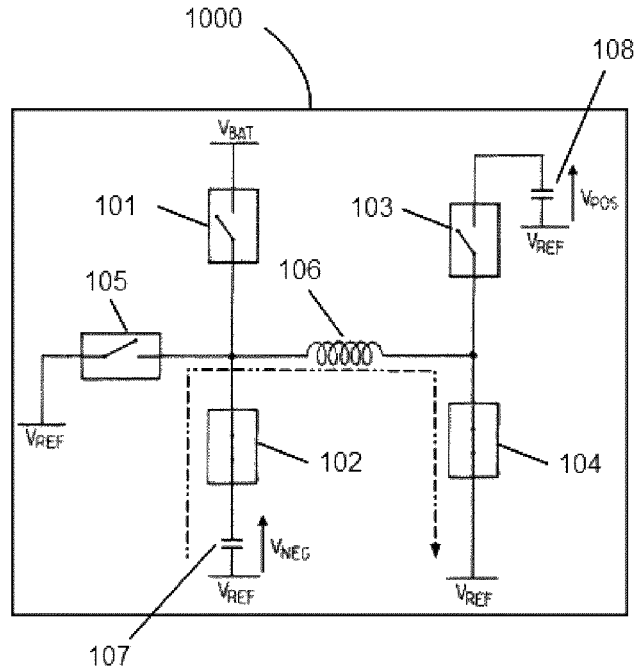
FIG. 8C is a block diagram illustrating an embodiment of yet another phase of a conduction cycle according to the proposed solution.

The two phases can be chosen from a group comprising embodiments of FIG. 8A (called thereinafter charging phase or CHG), FIG. 8B (called thereinafter positive discharging phase or $DISCHG_{POS}$) and FIG. 8C (called thereinafter negative discharging phase or $DISCHG_{NEG}$).

However, one should note that the first phase of the conduction cycle needs to be set to the embodiment of FIG. 8A CHG.

Therefore, at least four different variants of the conduction cycle can be implemented, based on particular chaining of the different phases during a clock cycle period.

Namely, the conduction cycle can be arranged in any of the following configurations:
 $CHG\text{-}DISCHG_{POS}$,
 $CHG\text{-}DISCHG_{NEG}$,
 $CHG\text{-}DISCHG_{POS}\text{-}DISCHG_{NEG}$, and
 $CHG\text{-}DISCHG_{NEG}\text{-}DISCHG_{POS}$.

Therefore, one should understand that the discharging phase could be performed to only one output or both outputs.

In an embodiment wherein discharging phase occurs on both outputs, this could be done by discharging sequentially (i.e. one after the other).

Let's describe, the different phases of FIG. 8A, FIG. 8B and FIG. 8C.

Referring to FIG. 8A, FIG. 8B and FIG. 8C there is shown therein the SIBOBB 1000 wherein, for instance, power switches 102 and 103 might be implemented as Schottky diodes, if for instance low output power is required out of the SIBOBB 1000.

In fact, Schottky diodes have the main advantage of switching naturally. Therefore its use could permit to make the economy of charging a power MOSFET gate thus reducing the switching loss in the SIBOBB 1000. Furthermore, Schottky diodes have low drop (i.e. few hundred of millivolts) and thus they have not so large ohmic losses.

This choice is also simplifying the conduction cycle, since in this case only three power switches 101, 104, 105 need to be controlled.

Obviously others type of diodes may be used as well depending on required efficiency and transient responses.

Referring to FIG. 8A, there is shown therein the power switches 102, 103 and 105 which are turned off and the power switches 101 and 104 which are turned on.

With such configuration, SIBOBB 1000 enters the charging phase CHG, wherein the inductor current is charged between $V_{BAT}$ and $V_{REF}$.

Referring to FIG. 8B, there is shown therein the power switches 103 and 105 which are turned on and the power switches 101, 102 and 104 which are turned off.

With such configuration, SIBOBB 1000 enters the positive discharging phase $DISCHG_{POS}$ wherein all or part of the inductor current is discharged to the positive output voltage $V_{POS}$.

Referring to FIG. 8C, there is shown therein the power switches 102 and 104 which are turned on and the power switches 101, 103 and 105 which are turned off.

With such configuration, SIBOBB 1000 enters the negative discharging phase $DISCHG_{NEG}$ wherein all or part of the inductor current is discharged to the negative output voltage $V_{NEG}$.

Figure 9:
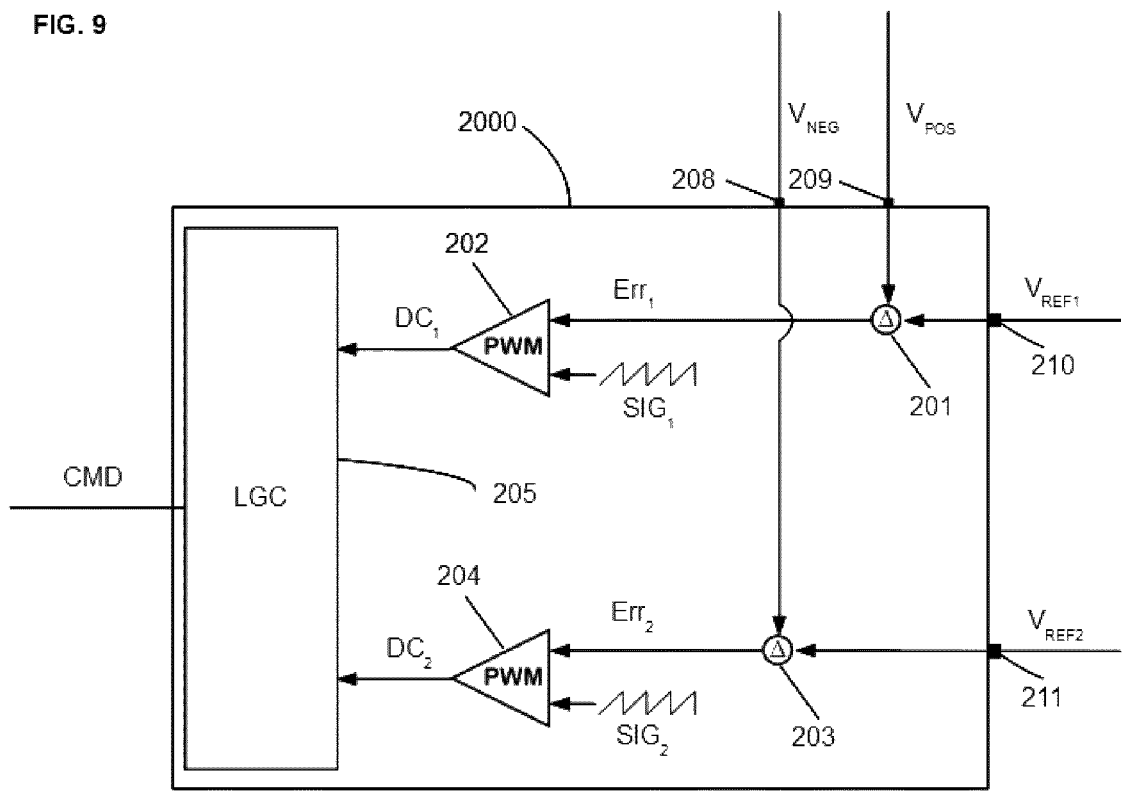
FIG. 9 is a block diagram illustrating an embodiment of a controller according to the proposed solution.

FIG. 9 is a block diagram illustrating an embodiment of CTRL 2000, wherein there is shown therein two difference units 201, 203, two error comparison units 202, 204 and a logic control unit LGC 205.

Referring to FIG. 9, $V_{POS}$ and $V_{REF1}$ are received at the input of the difference unit 201 which is configured to generate an error signal $ERR_1$ from a difference between $V_{POS}$ and $V_{REF1}$.

Also, in FIG. 9, $V_{NEG}$ and $V_{REF2}$ are received at the input of the difference unit 203 which is configured to generate an error signal $ERR_2$ from a difference between $V_{NEG}$ and $V_{REF2}$.

Afterwards, $ERR_1$ is presented at the input of the comparison unit 202 along with a signal $SIG_1$ while $ERR_2$ is presented at the input of the comparison unit 204 along with a signal $SIG_2$.

One should understand that the implementation of comparison unit 202 might be different from the implementation of comparison unit 204, the implementation of the difference unit 201 might be different from the implementation of the difference unit 203 and the implementation of SIG1 might be different from the implementation of $SIG_2$.

In an embodiment, the difference units 201, 203 are error amplifiers with proportional plus integral plus derivative (PID) control, the comparison units 202 and 204 are Pulse Width Modulation (PWM) modulators while signal $SIG_1$ and $SIG_2$ are, for instance, periodic ramp signals, which period equals the clock period such as saw-tooth signals or triangular signals.

With such embodiment, the comparison unit 202 is configured to generate a PWM signal $DC_1$ based on $ERR_1$ and $SIG_1$.

This operation is performed, for instance, by having the PWM modulator 202 setting a logic high state to $DC_1$ when $ERR_1$ is below $SIG_1$ and setting a logic low state to $DC_1$ when $ERR_1$ exceeds $SIG_1$.

Also, with such embodiment, the comparison unit 204 is configured to generate a PWM signal $DC_2$ based on $ERR_2$ and $SIG_2$.

This operation is performed, for instance, by having the PWM modulator 204 setting a logic high state to DC2 when $ERR_2$ is below $SIG_2$ and setting a logic low state to $DC_2$ when $ERR_2$ exceeds $SIG_2$.

In digital logic, logic high state would be a bit 1 and logic low state would be a bit 0 while in analog logic, logic high state would be a high voltage level and logic low state would be a low voltage level.

Finally, $DC_1$ and $DC_2$ are presented at the input of LGC 205 which is configured to generate the one or more control commands CMD used to drive DRV 3000 as already explained in the foregoing, in order to apply a given conduction cycle.

The choice of which configuration of the conduction cycle to be used depends on the different logic within which $DC_1$ and $DC_2$ are decoded, during the clock cycle period.

Additionally, since $DC_1$ and $DC_2$ are based on the positive output voltage $V_{POS}$, and on the negative output voltage $V_{NEG}$, therefore the conduction cycle depends on the positive output voltage $V_{POS}$, and on the negative output voltage $V_{NEG}$.

More generally, in the present application, $DC_1$ is used, alone, by LGC 205 to determine the amount of energy to be accumulated by SIBOBB 1000, namely by the current inductor 106, depending on the required positive output voltage $V_{POS}$, and on the negative output voltage $V_{NEG}$ that need to be delivered by the SIBOBB 1000.

On the other hand, $DC_1$ and $DC_2$ are used all together by LGC 205 to determine the amount of energy to be discharged to each output of SIBOBB 1000.

Figures 10, 11:
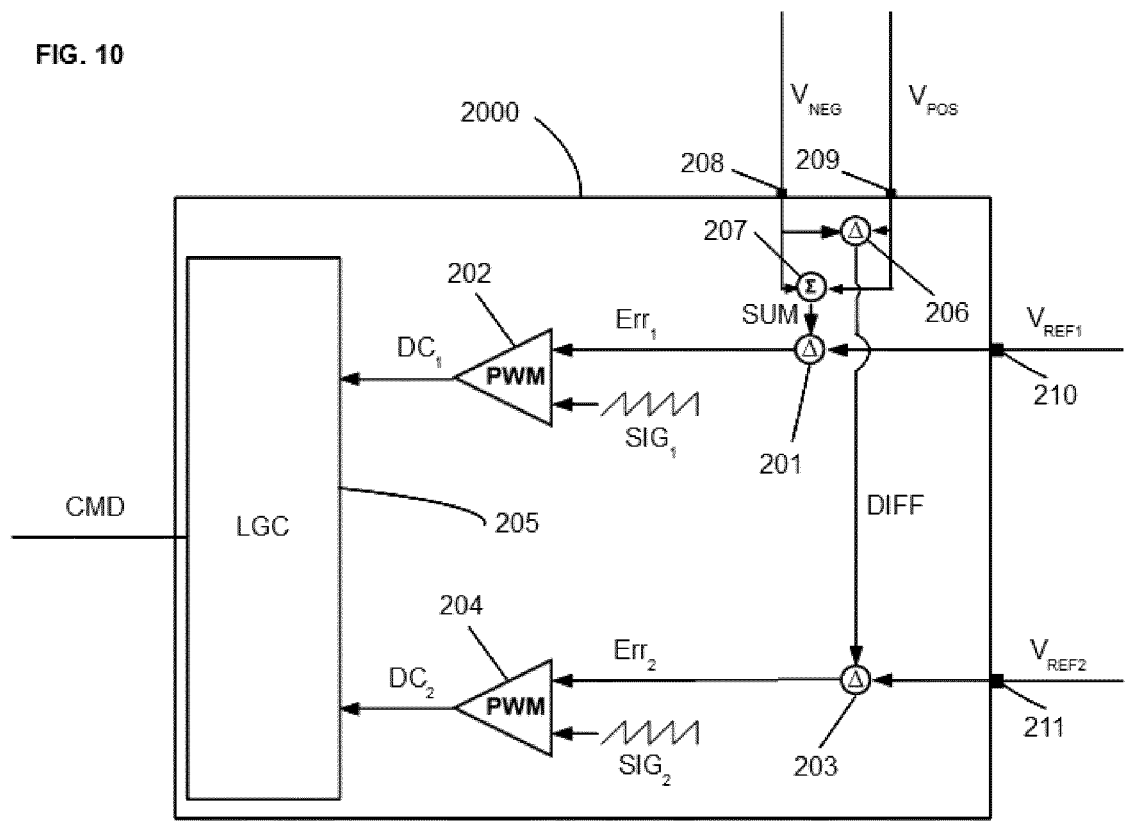
FIG. 10 is a block diagram illustrating another embodiment of a controller according to the proposed solution.
FIG. 11 is a table illustrating a truth table of a conduction cycle according to the proposed solution.

FIG. 10 is a block diagram illustrating an embodiment of CTRL 2000, wherein there is shown therein three difference units 201, 203, 206, one summation unit 207, two error comparison units 202, 204 and a logic control unit (LGC) 205.

Referring to FIG. 10, $V_{POS}$ and $V_{NEG}$ are received at the input of the difference unit 206 which is configured to generate a voltage DIFF from a difference between $V_{POS}$ and $V_{NEG}$.

Again in FIG. 10, $V_{POS}$ and $V_{NEG}$ are received at the input of the summation unit 207 which is configured to generate a voltage SUM from a sum of $V_{POS}$ and $V_{NEG}$.

Later in FIG. 10, SUM and $V_{REF1}$ are received at the input of the difference unit 201 which is configured to generate an error signal $ERR_1$ from a difference between SUM and $V_{REF1}$.

Also, in FIG. 10, DIFF and $V_{REF2}$ are received at the input of the difference unit 203 which is configured to generate an error signal $ERR_2$ from a difference between DIFF and $V_{REF2}$.

Then, $ERR_1$ is presented at the input of the comparison unit 202 along with a signal $SIG_1$ while $ERR_2$ is presented at the input of the comparison unit 204 along with a signal $SIG_2$.

One should understand that each of the implementation of comparison units 202, 204 might be different from each other, each of the implementation of the difference units 201, 203, 206 might be different from each other as well and each of the implementation of $SIG_1$, $SIG_2$ might be different from each other.

In an embodiment, the difference units 201, 203, 206 are error amplifiers with proportional plus integral plus derivative (PID) control, the comparison units 202 and 204 are Pulse Width Modulation (PWM) generators while signal $SIG_1$ and $SIG_2$ are a signal of a saw-tooth signal or a triangular signal.

With such embodiment, the comparison unit 202 is configured to generate a PWM signal $DC_1$ based $ERR_1$ and $SIG_1$.

This operation is performed, for instance, by having the PWM modulator 202 setting a logic high state to $DC_1$ when $ERR_1$ is below $SIG_1$ and setting a logic low state to $DC_1$ when $ERR_1$ exceeds $SIG_1$.

Also, with such embodiment, the comparison unit 204 is configured to generate a PWM signal $DC_2$ based $ERR_2$ and $SIG_2$.

This operation is performed, for instance, by having the PWM modulator 204 setting a logic high state to $DC_2$ when $ERR_2$ is below $SIG_2$ and setting a logic low state to $DC_2$ when $ERR_2$ exceeds $SIG_2$.

In digital logic, logic high state would be a bit 1 and logic low state would be a bit 0 while in analog logic, logic high state would be a high voltage level and logic low state would be a low voltage level.

Finally, $DC_1$ and $DC_2$ are presented at the input of LGC 205 which is configured to generated the one or more control commands CMD used to drive DRV 3000 as already explained in the foregoing, in order to apply a given conduction cycle.

The choice of which configuration of the conduction cycle to be used depends on the different logic within which $DC_1$ and $DC_2$ are decoded, during the clock cycle period.

Additionally, since $DC_1$ and $DC_2$ are based on the positive output voltage $V_{POS}$, and on the negative output voltage $V_{NEG}$, therefore the conduction cycle depends on the positive output voltage $V_{POS}$, and on the negative output voltage $V_{NEG}$.

More generally, in the present application, $DC_1$ is used, alone, by LGC 205 to determine the amount of energy to be accumulated by SIBOBB 1000, namely by the current inductor 106, depending on the required positive output voltage $V_{POS}$, and on the negative output voltage $V_{NEG}$ that need to be delivered by the SIBOBB 1000.

On the other hand, $DC_1$ and $DC_2$ are used all together by LGC 205 to determine the amount of energy to be discharged to each output of SIBOBB 1000.

One should understand, in other words, that the amount of energy to be accumulated or discharged, as explained in the foregoing embodiments of FIG. 9 and FIG. 10, depends on the duty cycle of the corresponding signals $DC_1$ and $DC_2$ wherein the duty cycle should be understood as being the amount of time during which $DC_1$ or $DC_2$ are in a logic high state, during the clock cycle period.

The embodiment of the CTRL 2000 of FIG. 9 is mostly suitable for cases where there is a load current symmetry of negative output current and positive output current that is required at the output 109, 110, 111, 112 of SIBOBB 1000.

In case where a total load current asymmetry of negative output current and positive output current is needed at the output 109, 110, 111, 112 of SIBOBB 1000, embodiment of the CTRL 2000 of FIG. 10 is a possible preferred solution.

Hence, with the configuration of FIG. 10, weakness of state of the art regarding control of SIBO-Buck-Boost converters to deliver independent buck or boost to each input voltage is overcome.

In fact, with this embodiment, depending on the duty cycles of $DC_1$ and/or $DC_2$, one output 109, 110, 111, 112 of SIBOBB 1000 may signify that it does not need energy and that only the other output should be supplied. Thus, the conduction cycle could, for instance, comprise two phases corresponding, first to a charging phase followed by a discharging phase to an output 109, 110, 111, 112 of SIBOBB 1000.

Another conduction cycle could, for instance, comprise three phases corresponding, first to a charging phase followed by a discharging phase to an output 109, 110, 111, 112 of SIBOBB 1000 and then another discharging phase to the other output 109, 110, 111, 112 of SIBOBB 1000.

In this case, positive discharging phase $DISCHG_{POS}$ could be performed before negative discharging phase or $DISCHG_{NEG}$ or conversely, negative discharging phase $DISCHG_{NEG}$ could be performed before positive discharging phase or $DISCHG_{POS}$.

The different logic state combinations of the conduction cycle can be summarised by the exemplary truth table 600 of FIG. 11, wherein digital logic is used.

Possibly, truth table 600 is implemented within LGC 205.

As it can been seen, when $DC_1$ is at a logic state corresponding to bit 0 (i.e. when $ERR_1$ exceeds $SIG_1$) and whatever the logic state of $DC_2$, then SIBOBB 1000 would be instructed by CTRL 2000, through DRV 300, to initiate the charging phase CHG.

This is why it has been stated above that $DC_1$, alone, might be used to determine the amount of energy to be accumulated by SIBOBB 1000.

However, when $DC_1$ is at a logic state corresponding to bit 1 (i.e. when $ERR_1$ is below $SIG_1$) and $DC_2$ is at a logic state corresponding to bit 0 (i.e. when ERR2 exceeds $SIG_2$) then SIBOBB 1000 would be instructed by CTRL 2000, through DRV 300, to initiate the discharging phase $DISCHG_{pos}$.

This is why it has been stated above that $DC_1$ and $DC_2$ are used to determine the amount of energy to be discharged to each output of SIBOBB 1000. As stated earlier, the amount of discharged energy to each output mainly depends on the duty cycle of $DC_1$ and $DC_2$.

Also, when $DC_1$ is at a logic state corresponding to bit 1 (i.e. when $ERR_1$ is below $SIG_1$) and $DC_2$ is at a logic state corresponding to bit 1 (i.e. when ERR2 is below $SIG_2$) then SIBOBB 1000 would be instructed by CTRL 2000, through DRV 300, to initiate the discharging phase $DISCHG_{NEG}$.

This is why it has been stated above that $DC_1$ and $DC_2$ are used to determine the amount of energy to be discharged to each output of SIBOBB 1000.

Again, as stated earlier, the amount of discharged energy to each output 109, 110, 111, 112 of SIBOBB 1000, mainly depends on the duty cycle of $DC_1$ and $DC_2$.

In order to fully understand the proposed solution, two exemplary embodiments of the proposed conduction cycle will be described in FIG. 12 and FIG. 13.

Referring to FIG. 12 and FIG. 13, there is shown therein three timing diagrams A, B, C represented over two clock cycle periods.

Timing diagram A shows the evolution of $ERR_1$, $ERR_2$, $SIG_1$ and $SIG_2$.

For the purpose of clarity and simplicity, $SIG_1$ and $SIG_2$ are considered alike and future references would be made to $SIG_1$ only as being a saw-tooth signal.

Timing diagrams B and C show the evolution of $DC_1$ and $DC_2$, respectively.

Referring to FIG. 12, in the first clock cycle period, it can be seen that during CHG phase, both $ERR_1$ and $ERR_2$ exceed $SIG_1$ thus leading $DC_1$ and $DC_2$ being at the logic low state. In digital logic, this corresponds to configuration '0' as already described in FIG. 11.

Later, it can be seen that during $DISCHG_{POS}$ phase, $ERR_1$ is below $SIG_1$ thus leading $DC_1$ being at the logic high state and $ERR_2$ exceeds $SIG_1$ thus leading $DC_2$ being at the logic low state.

In digital logic, this corresponds to configuration '10' as already described in FIG. 11.

Later again, it can be seen that during $DISCHG_{NEG}$ phase, $ERR_1$ is below $SIG_1$ thus leading $DC_1$ being at the logic high state and $ERR_2$ is below $SIG_1$ thus leading $DC_2$ being at the logic high state.

In digital logic, this corresponds to configuration '11' as already described in FIG. 11.

Referring to FIG. 12, in the second clock cycle period, it can be seen that during the first CHG phase, both $ERR_1$ and $ERR_2$ exceed $SIG_1$ thus leading $DC_1$ and $DC_2$ being at the logic low state.

In digital logic, this corresponds to configuration '0' as already described in FIG. 11.

Later, it can be seen that during the second CHG phase, $ERR_2$ is below $SIG_1$ thus leading $DC_2$ being at the logic high state and $ERR_1$ exceeds $SIG_1$ thus leading $DC_1$ being at the logic low state.

In digital logic, this corresponds to configuration '01' as already described in FIG. 11.

Later again, it can be seen that during $DISCHG_{NEG}$ phase, $ERR_1$ is below $SIG_1$ thus leading $DC_1$ being at the logic high state and $ERR_2$ is below $SIG_1$ thus leading $DC_2$ being at the logic high state.

In digital logic, this corresponds to configuration '1' as already described in FIG. 11.

Referring to FIG. 13, in the first clock cycle period, it can be seen that during CHG phase, both $ERR_1$ and $ERR_2$ exceed $SIG_1$ thus leading $DC_1$ and $DC_2$ being at the logic low state.

In digital logic, this corresponds to configuration '00' as already described in FIG. 11.

Later, it can be seen that during $DISCHG_{POS}$ phase, $ERR_1$ is below $SIG_1$ thus leading $DC_1$ being at the logic high state and $ERR_2$ exceeds $SIG_1$ thus leading $DC_2$ being at the logic low state.

In digital logic, this corresponds to configuration '10' as already described in FIG. 11.

Referring to FIG. 13, in the second clock cycle period, it can be seen that during the first CHG phase, both $ERR_1$ and $ERR_2$ exceed $SIG_1$ thus leading $DC_1$ and $DC_2$ being at the logic low state.

In digital logic, this corresponds to configuration '00' as already described in FIG. 11.

Later, it can be seen that during the second $DISCHG_{NEG}$ phase, both $ERR_1$ and $ERR_2$ are below $SIG_1$ thus leading $DC_1$ and $DC_2$ being at the logic high state.

In digital logic, this corresponds to configuration '11' as already described in FIG. 11.

Figure 14:
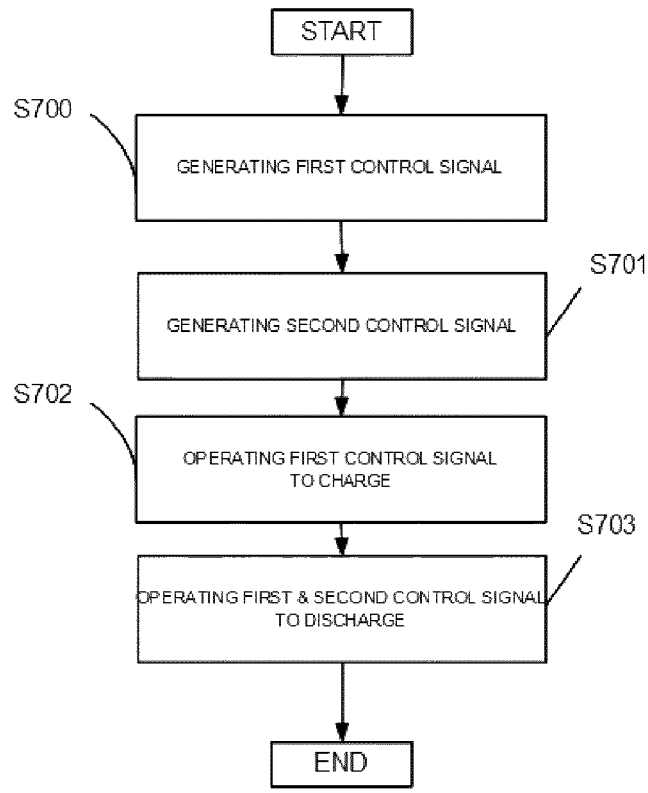
FIG. 14 is a flow diagram illustrating an embodiment of the proposed solution.

FIG. 14 is a flow diagram illustrating an embodiment of the proposed solution corresponding to the embodiment as already described above for FIG. 13.

Referring to FIG. 14, in step S700, a first control signal $DC_1$ based on, at least, the negative output voltage, a negative reference voltage and a saw-tooth signal is generated as already described above.

Then, in a step S701, a second control $DC_2$ signal based on, at least, the positive output voltage, positive reference voltage and a saw-tooth signal is generated as already described above.

Later, in a step S702, the SIBOBB 1000 is operated, based on a given logic and the first control signal so as to initiate a charging phase CHG, such that a first duty cycle of the first control signal is controlling an amount of energy to be accumulated by the SIBOBB 1000 as already described above.

Finally, in a step S703, the SIBOBB 1000 is operated, based on the given logic and the first control signal simultaneously with the second control signal so as to initiate an independent discharging phase $DISCHG_{NEG}$, $DISCHG_{POS}$ of the accumulated energy, in a buck-type or boost-type, to at least an output of the SIBOBB 1000 such that a second duty cycle of the second control signal is controlling an amount of energy to be discharged by the SIBOBB 1000 as already described above.

After that, the algorithm would stop.

Figure 15:
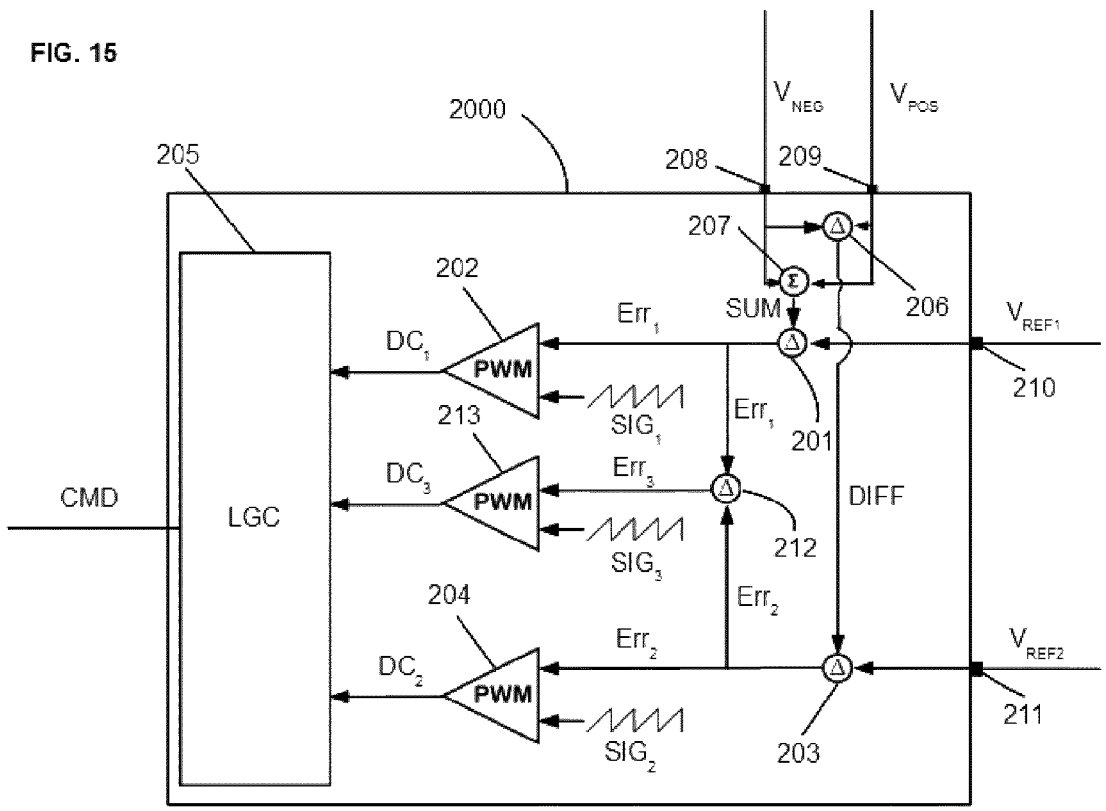
FIG. 15 is a block diagram illustrating yet another embodiment of a controller according to the proposed solution.

FIG. 15 is a block diagram illustrating an embodiment of CTRL 2000.

With the embodiment of FIG. 15, the average current passing through the inductor 106 and the ohmic losses are optimised.

In fact, for certain industry, such as the mobile phone industry, there are stringent requirements regarding the size of the components that could be used, in order to produce low cost and small physical size devices in order to suit customers needs.

This is the case, for instance, for the inductor 106 that is used in the SIBOBB 1000 if the latter need to be placed as close a possible to the mobile phone screen.

One should know that the height of an inductor is proportional to the load current, thus it could be said that higher inductors can handle more currents than smaller ones.

In the SIBOBB 1000 the amount of current passing through the inductor 106, at a given moment in time, can be determined by the following formula:

$I_L = I_{OUT} \times V_{OUT}/V_{IN}$, wherein $I_L$ is the amount of current in the inductor, $I_{OUT}$ is the amount of current at the output of the SIBOBB 1000, $V_{OUT}$ is the output voltage of the SIBOBB 1000 and $V_{IN}$ is the input voltage of the SIBOBB 1000 such as $V_{BAT}$.

Therefore, one should understand that as $V_{IN}$ is decreasing and $V_{OUT}$ is increasing, depending on the application, high peak currents (e.g. 2 Amps) could be experienced in the inductor 106, thus reaching the current saturation of the inductor 106.

This situation could occur with conduction cycles feeding outputs 109, 110, 111, 112 of the SIBOBB 1000 sequentially.

However, as said above, high peak currents would require inductors that are high in size (e.g. 2 mm) while, for instance, in the mobile phone industry, inductors with smaller height (<1 mm) are required.

This is not acceptable and it should be possible to deliver independent buck-type or boost-type bipolar voltages in a SIBOBB 1000 using small sized inductors.

This optimisation could be achieved by discharging the inductor, at some point, through the bipolar outputs of the SIBOBB 1000 simultaneously instead of doing it sequentially.

Namely, this optimisation involves the use of conduction cycles made of at least three phases.

Figure 16:
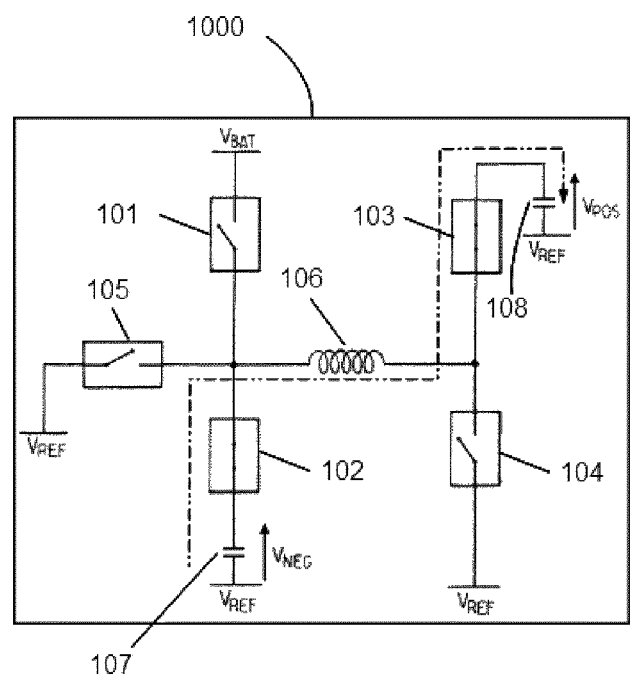
FIG. 16 is a block diagram illustrating an embodiment of still another phase of a conduction cycle according to the proposed solution.

The three phases can be chosen from a group comprising a charging phase CHG, a positive discharging phase $DISCHG_{POS}$ and negative discharging phase $DISCHG_{NEG}$ as already described above, plus another discharging phase $DISCHG_{SIMUL}$ performed simultaneously in all outputs as shown in FIG. 16 and described below.

However, one should note that the first phase of the conduction cycle needs to be set to the charging phase CHG.

Referring to FIG. 16, there is shown therein the power switches 101, 104 and 105 which are turned off and the power switches 102 and 103 which are turned on.

With such configuration, SIBOBB 1000 enters the discharging phase $DISCHG_{SIMUL}$, wherein all or part of the inductor current is discharged simultaneously to the positive output voltage $V_{POS}$ and the negative output voltage $V_{NEG}$.

Therefore, in this embodiment of FIG. 15, at least two different configurations of the conduction cycle can be implemented, based on particular chaining of the different phases during a clock cycle period.

Namely, the conduction cycle can be arranged in any of the following configurations:

CHG-$DISCHG_{POS}$-$DISCHG_{SIMUL}$, and
CHG-$DISCHG_{NEG}$-$DISCHG_{SIMUL}$.

For instance, conduction cycle "CHG-$DISCHG_{POS}$-$DISCHG_{SIMUL}$" could be used to discharge more energy into the positive output 110, considering that it requires more energy than the negative output 109.

For instance, conduction cycle "CHG-DISCHG$_{NEG}$-DISCHG$_{SIMUL}$" could be used to discharge more energy into the negative output 109, considering that it requires more energy than the positive output 110.

Therefore, one should understand that discharging phase DISCHG$_{SIMUL}$ is to be performed simultaneously on both outputs.

Referring to FIG. 15, there is shown therein four difference units 201, 203, 206, 212, one summation unit 207, three error comparison units 202, 204, 213 and a logic control unit (LGC) 205.

Referring to FIG. 15, V$_{POS}$ and V$_{NEG}$ are received at the input of the difference unit 206 which is configured to generate a voltage DIFF from a difference between V$_{POS}$ and V$_{NEG}$.

Again in FIG. 15, V$_{POS}$ and V$_{NEG}$ are received at the input of the summation unit 207 which is configured to generate a voltage SUM from a sum of V$_{POS}$ and V$_{NEG}$.

Later in FIG. 15, SUM and V$_{REF1}$ are received at the input of the difference unit 201 which is configured to generate an error signal ERR$_1$ from a difference between SUM and V$_{REF1}$.

Also, in FIG. 15, DIFF and V$_{REF2}$ are received at the input of the difference unit 203 which is configured to generate an error signal ERR$_2$ from a difference between DIFF and V$_{REF2}$.

Later, ERR$_1$ and ERR$_2$ are received at the input of the difference unit 212 which is configured to generate an error signal ERR$_3$ from a difference between ERR$_1$ and ERR$_2$.

Subsequently, ERR$_1$ is presented at the input of the comparison unit 202 along with a signal SIG$_1$, ERR$_2$ is presented at the input of the comparison unit 204 along with a signal SIG$_2$ and ERR$_3$ is presented at the input of the comparison unit 213 along with a signal SIG$_3$.

One should understand that each of the implementation of comparison units 202, 204, 213 might be different from each other, each of the implementation of the difference units 201, 203, 206, 212 might be different from each other as well and each of the implementation of SIG$_1$, SIG$_2$, SIG$_3$ might be different from each other.

In an embodiment, the difference units 201, 203, 206, 212 are error amplifiers with proportional plus integral plus derivative (PID) control, the comparison units 202, 204, 213 are Pulse Width Modulation (PWM) generators while signal SIG$_1$, SIG$_2$, SIG$_3$ are a signal of a saw-tooth signal or a triangular signal.

With such embodiment, the comparison unit 202 is configured to generate a PWM signal DC$_1$ based on ERR$_1$ and SIG$_1$.

This operation is performed, for instance, by having the PWM modulator 202 setting a logic high state to DC$_1$ when ERR$_1$ is below SIG$_1$ and setting a logic low state to DC$_1$ when ERR$_1$ exceeds SIG$_1$.

Also, with such embodiment, the comparison unit 204 is configured to generate a PWM signal DC$_2$ based on ERR$_2$ and SIG$_2$.

This operation is performed, for instance, by having the PWM modulator 204 setting a logic high state to DC$_2$ when ERR$_2$ is below SIG$_2$ and setting a logic low state to DC$_2$ when ERR$_2$ exceeds SIG$_2$.

Again, with such embodiment, the comparison unit 213 is configured to generate a PWM signal DC$_3$ based on ERR$_1$ and ERR$_2$.

This operation is performed, for instance, by setting a logic high state to DC$_3$ when ERR$_3$ is below SIG$_3$ and setting a logic low state to DC$_3$ when ERR$_3$ exceeds SIG$_3$ In digital logic, logic high state would be a bit 1 and logic low state would be a bit 0 while in analog logic, logic high state would be a high voltage level and logic low state would be a low voltage level.

Finally, DC$_1$, DC$_2$ and DC$_3$ are presented at the input of LGC 205 which is configured to generated the one or more control commands CMD used to drive DRV 3000 as already explained in the foregoing, in order to apply a given conduction cycle.

The choice of which configuration of the conduction cycle to be used depends on the different logic within which DC$_1$, DC$_2$ and DC$_3$ are, during the clock cycle period.

Additionally, since DC$_1$, DC$_2$ and DC$_3$ are based on the positive output voltage V$_{POS}$, and on the negative output voltage V$_{NEG}$, therefore the conduction cycle depends on the positive output voltage V$_{POS}$, and on the negative output voltage V$_{NEG}$.

More generally, in the present application, DC$_1$ is used, alone, by LGC 205 to determine the amount of energy to be accumulated by SIBOBB 1000.

On the other hand, DC$_1$, DC$_2$ and DC$_3$ are used all together by LGC 205 to determine the amount of energy to be discharged to each output of SIBOBB 1000.

This could be achieved by having DC$_2$ and DC$_3$ being symmetrical with respect to DC$_1$, thus creating the two additional phases of the conduction cycle.

In this case, at a given moment in time, DC$_2$ could be equal to DC$_1$ plus a given delta value while DC$_3$ would be equal to DC$_1$ minus the given delta value.

Another possibility is that, at a given moment in time, DC$_3$ could be equal to DC$_1$ plus a given delta value while DC$_2$ is equal to DC$_1$ minus the given delta value.

One should understand that the amount of energy to be accumulated or discharged, as explained in the foregoing embodiment of FIG. 15, depends on the duty cycle of the corresponding signals DC$_1$, DC$_2$ and DC$_3$ wherein the duty cycle should be understood as being the amount of time during which DC$_1$, DC$_2$ and DC$_3$ are in a logic high state, during the clock cycle period.

The proposed solution enables to optimise the amount of current that passes through the inductor 106 of the SIBOBB 1000, thus enabling the use of small sized conductors for implementation.

An apparatus embodying features of the proposed solution is also claimed.

A display integrated circuit comprising the apparatus is also claimed.

The latter may comprise also, for instance, a display panel, the SIBOBB 1000, a processor 4000.

A wireless device comprising the display integrated circuit is also claimed.

In the claims, the word "comprising" does not exclude other elements or steps, and the indefinite article "a" or "an" does not exclude a plurality. A single unit may fulfil the functions of several items recited in the claims.

For instance, reference voltages V$_{REF1}$, V$_{REF2}$ might be stored inside the processor PROC 4000 or outside within a memory such as a register.

For instance also, DRV 3000 might be implemented inside CTRL 2000.

As explained as well earlier, CTRL 2000 might be implemented with digital logic, analog logic or mixed-signal logic without departing from the scope of the proposed solution.

In the foregoing description, power switches 101, 102, 103, 104 and 105 are respectively substantially equivalent to the power switches 100, 20, 400, 300 and 200.

The mere fact that different features are recited in mutually different dependent claims does not indicate that a combination of these features cannot be advantageously used. Any reference signs in the claims should not be construed as limiting the scope of the proposed solution.

Reference Documents List

Document (1): WEI-CHUNG, Chen, et al. A single-inductor bipolar-output converter with 5 mV positive voltage ripple for active matrix OLED. *Energy Conversion Congress and Exposition (ECCE)*. September 2011, p. 3229-3233.

Document (2): TEXAS INSTRUMENTS, TPS65136. Single Inductor Multiple Output Regulator for AMOLED. http://www.ti.com/lit/ds/symlink/tps65136.pdf (849 KB). 7 Jul. 2008.

Document (3): WO2012/032176.

The invention claimed is:

1. A method of driving a Single Inductor Bipolar Output Buck-Boost, SIBOBB, clocked by a clock signal having a given clock cycle period, the SIBOBB comprising at least five power switches, a positive output at which to output a positive output voltage and a negative output at which to output a negative output voltage, the method comprising:
during the clock cycle period:
generating, by a first Pulse Width Modulation, PWM, modulator, a first control signal based on a first comparison signal and a first error signal, wherein the first error signal corresponds to a voltage difference between (i) a sum reference voltage and (ii) a voltage sum of the positive output voltage and the negative output voltage;
generating, by a second PWM modulator, a second control signal based on a second comparison signal and a second error signal, wherein the second error signal corresponds to a voltage difference between (i) a difference reference voltage and (ii) a voltage difference between the positive output voltage and;
initiating a charging phase of the SIBOBB based on a monitoring of the first control signal, a first amount of energy to be accumulated by the SIBOBB during the charging phase being controlled by a first duty cycle of the first control signal;
initiating a first discharging phase of discharging a second amount of energy accumulated in the SIBOBB, to at least one of the positive output and the negative output in a buck-type or boost-type configuration of the SIBOBB, based on a simultaneous monitoring of the first control signal and the second control signal, the second amount of energy being controlled by a second duty cycle of the second control signal,
wherein the charging phase is initiated before the first discharging phase.

2. The method of claim 1, wherein the SIBOBB has:
an input for receiving a first potential; and
an electrical circuit, comprising:
at least a first control input, a second control input, a third control input, a fourth control input, a fifth control input, and a sixth control input, a seventh control input, an eighth control input,
at least a first switch comprising a first terminal and a second terminal, the first switch being controlled by setting the first control input to a first control voltage, the first control voltage being less than a maximum value of the first potential at the first terminal, and greater than a third potential at the second terminal, the first switch being closed by setting the second control input to the first control voltage, or, the first switch being opened by setting the second control input to a second control voltage substantially equal to the third potential of the second terminal,
at least a second switch comprising a third terminal and a fourth terminal, the second switch being controlled by setting the third control input to a third control voltage, the third control voltage being less than a first minimum value of the first potential at the fourth terminal and greater than the third potential at the third terminal, the second switch being closed by setting the fourth control input to the third control voltage, or the second switch being opened by setting the fourth control input to a fourth control voltage substantially equal to the maximum value of the of the first potential of the fourth terminal,
at least a third switch comprising a fifth terminal and a sixth terminal, the third switch controlled to be open by setting the fifth control input and the sixth control input to a reference potential common to the entire SIBOBB, or by setting the fifth control input to the third potential and the sixth control input to the reference potential, or to be closed by setting the fifth control input to the third potential and the sixth control input to the first potential,
at least a fourth switch comprising a seventh terminal and a eighth terminal, the fourth switch being controlled to be open by setting the seventh control input to the reference potential, or to be closed by setting the seventh control input to the first potential,
at least a fifth switch comprising a ninth terminal and a tenth terminal, the fifth switch being controlled: to be closed by setting the eighth control input to the reference potential, or to be open by setting the seventh control input to the second potential,
wherein
a first difference between the first control voltage and the second control voltage is greater than both a first threshold voltage of a first transistor and a second threshold voltage of a second transistor when the first switch is closed,
a second difference between the third control voltage and the fourth control voltage is greater than both a third threshold voltage of a third transistor and a fourth threshold voltage of a fourth transistor when the second switch is closed,
a third difference between a second potential and the reference potential is greater than the fourth threshold voltage, and
a fourth difference between the third potential and the reference potential is less than the third threshold voltage,
the first switch is controlled by a potential received on the first control input and a potential received on the second control input, in a manner that controls a conversion of the first potential into the second potential and into the third potential,
the second terminal is coupled to a first node of the circuit at the third potential when the circuit is in operation,
the second switch is controlled by a potential received on the third control input and a potential received on the fourth control input, in a manner that controls a conversion of the first potential into the second potential and into the third potential, the fourth terminal is coupled to a second node of the circuit at the first potential when the circuit is in operation, the third switch is controlled by a potential received on the fifth control input, and a potential received on the sixth control input, in a manner that controls a conversion of the first potential into the second potential and into the third potential, the fifth terminal is coupled to a third node of the circuit at the reference potential when the circuit is in operation, the fourth switch is controlled by a potential received on the seventh control input, in a manner that controls a conversion of the first potential into the second potential and into the third potential, the seventh terminal is coupled to a fourth node of the circuit at the reference potential when the circuit is in operation, the fifth switch is controlled by a potential received on the eight control input, in a manner that controls a conversion of the first potential into the second potential and into the third potential, the ninth terminal being coupled to a fifth node of the circuit at the second potential when the circuit is in operation, the electrical circuit further comprising outputs for supplying the second potential and the third potential, wherein, the reference potential is applied to the first control input of the first switch and/or a reference potential is applied to the third control input of the second switch.

3. The method of claim 1, wherein the first discharging phase comprises discharging energy to the positive output followed by discharging energy to the negative output.

4. The method of claim 1, wherein the first discharging phase comprises discharging energy to the positive output after discharging energy to the negative output.

5. The method of claim 1, further comprising:
generating a third control signal based on, at least, the first control signal and the second control signal;
initiating a second discharging phase of discharging energy accumulated in the SIBOBB simultaneously to both the positive output and the negative output in a buck-type or boost-type configuration of the SIBOBB, based on a monitoring of the first control signal, the second control signal and the third control signal simultaneously, during said second discharging phase, a third amount of energy to be discharged by the SIBOBB being controlled by the second duty cycle of the second control signal and a third duty cycle of the third control signal,
wherein the charging phase is initiated before the second discharging phase.

6. The method of claim 5, wherein the second discharging phase is initiated before the first discharging phase.

7. The method of claim 5, wherein the second discharging phase is initiated after the first discharging phase.

8. The method of claim 1, wherein the first and second comparison signals are saw-tooth signals or triangular signals.

9. A method of driving a Single Inductor Bipolar Output Buck-Boost, SIBOBB, clocked by a clock signal having a given clock cycle period, the SIBOBB comprising at least five power switches, a positive output at which to output a positive output voltage and a negative output at which to output a negative output voltage, the method comprising:
during the clock cycle period:
generating a first control signal based at least on the positive output voltage and a positive reference voltage;
generating a second control signal based at least on the negative output voltage and a negative reference voltage;
initiating a charging phase of the SIBOBB based on a monitoring of the first control signal, a first amount of energy to be accumulated by the SIBOBB during the charging phase being controlled by a first duty cycle of the first control signal;
initiating a first discharging phase of discharging a second amount of energy accumulated in the SIBOBB, to at least one of the positive output and the negative output in a buck-type or boost-type configuration of the SIBOBB, based on a simultaneous monitoring of the first control signal and the second control signal, the second amount of energy being controlled by a second duty cycle of the second control signal,
wherein the charging phase is initiated before the first discharging phase,
wherein the first, the second and a third control signal are generated by a Pulse Width Modulation, PWM, modulator based on respective comparison signals, wherein at least some of the comparison signals are saw-tooth signals or triangular signals,
wherein the generating of the third control signal is performed by inputting into the PWM modulator, a third error signal corresponding to a voltage difference between a first error signal and a second error signal.

10. An apparatus for driving a Single Inductor Bipolar Output Buck-Boost, SIBOBB, clocked by a clock signal having a given clock cycle period, the SIBOBB comprising at least five power switches and a positive output to output a positive output voltage and a negative output to output a negative output voltage, the apparatus comprising:
a first Pulse Width Modulation, PWM, modulator, which generates a first control signal based on a first comparison signal and a first error signal, wherein the first error signal corresponds to a voltage difference between (i) a sum reference voltage and (ii) a voltage sum of the positive output voltage and the negative output voltage;
generating second PWM modulator, which generates a second control signal based on a second comparison signal and a second error signal, wherein the second error signal is a voltage difference between (i) a difference reference voltage and (ii) a voltage difference between the positive output voltage and the negative output voltage;
a controller configured to
initiate a charging phase of the SIBOBB based on a monitoring of the first control signal, a first amount of energy to be accumulated by the SIBOBB during the charging period being controlled by a first duty cycle of the first control signal;
initiate a first discharging phase of discharging a second amount of energy accumulated in the SIBOBB, to at least one of the positive output and the negative output in a buck-type or boost-type configuration of the SIBOBB, based on a simultaneous monitoring of the first control signal and the second control signal, the second amount of energy being controlled by a second duty cycle of the second control signal, wherein, the controller activates the charging phase before activating the first discharging phase.

11. The apparatus of claim 10, wherein the SIBOBB comprises:
an input for receiving a first potential; and
an electrical circuit having:
at least a first control input, a second control input, a third control input, a fourth control input, a fifth control input, and a sixth control input, a seventh control input, an eighth control input,
at least a first switch comprising a first terminal and a second terminal, the first switch being controlled by setting the first control input to a first control voltage, the first control voltage being less than a maximum value of the first potential at the first terminal, and greater than a third potential at the second terminal, the first switch being closed by setting the second control input to the first control voltage, or, being closed by setting the second control input to a second control voltage substantially equal to the third potential of the second terminal,
at least a second switch comprising a third terminal and a fourth terminal, the second switch being controlled by setting the third control input to a third control voltage, the third control voltage being less than a first minimum value of the first potential at the fourth terminal and greater than the value of the third potential at the third terminal, the second switch being closed by setting the fourth control input to the third control voltage, or the second switch being opened by setting the fourth control input to a fourth control voltage substantially equal to the maximum value of the of the first potential of the fourth terminal,
at least a third switch comprising a fifth terminal and a sixth terminal, the third switch being controlled to be open by setting the fifth control input and the sixth control input to a reference potential common to the entire SIBOBB, or by setting the fifth control input to the third potential and the sixth control input to the reference potential, or to be closed by setting the fifth control input to the third potential and the sixth control input to the first potential,
at least a fourth switch comprising a seventh terminal and a eighth terminal, the fourth switch being controlled: to be open by setting the seventh control input to the reference potential, or to be closed by setting the seventh control input to the first potential,
at least a fifth switch comprising a ninth terminal and a tenth terminal, the fifth switch being controlled: to be closed by setting the eighth control input to the reference potential, or to be open by setting the seventh control input to the second potential;
wherein
a first difference between the first control voltage and the second control voltage is greater than both a first threshold voltage of a first transistor and a second threshold voltage of a second transistor when the first switch is closed,
a second difference between the third control voltage and the fourth control voltage is greater than both a third threshold voltage of a third transistor and a fourth threshold voltage of a fourth transistor when the second switch is closed,
a third difference between a second potential and the reference potential is greater than the fourth threshold voltage, and a fourth difference between the third potential and the reference potential is less than the third threshold voltage,
the first switch is controlled by a potential received on the first control input and a potential received on the second control input, in a manner that controls conversion of the first potential into the second potential and into the third potential,
the second terminal is coupled to a first node of the circuit at the third potential when the circuit is in operation,
the second switch is controlled by a potential received on the third control input and a potential received on the fourth control input, in a manner that controls conversion of the first potential into the second potential and into the third potential,
the fourth terminal is coupled to a second node of the circuit at the first potential when the circuit is in operation,
the third switch is controlled by a potential received on the fifth control input, and a potential received on the sixth control input, in a manner that controls conversion of the first potential into the second potential and into the third potential,
the fifth terminal is coupled to a third node of the circuit at the reference potential when the circuit is in operation,
the fourth switch is controlled by a potential received on the seventh control input, in a manner that controls conversion of the first potential into the second potential and into the third potential
the seventh terminal being coupled to a fourth node of the circuit at the reference potential when the circuit is in operation,
the fifth switch is controlled by a potential received on the eight control input, in a manner that controls conversion of the first potential into the second potential and into the third potential,
the ninth terminal being coupled to a fifth node of the circuit at the second potential when the circuit is in operation,
the electrical circuit further comprising outputs for supplying the second potential and the third potential,
wherein, the reference potential is applied to the first control input of the first switch and/or a reference potential is applied to the third control input of the second switch.

12. The apparatus of claim 10, wherein the first discharging phase comprises discharging energy in both the positive output and the negative output sequentially, activating the discharging of the energy to the positive output before activating the discharging of the energy to the negative output.

13. The apparatus of claim 10, wherein the first discharging phase comprises discharging energy in both the positive output and the negative output sequentially, activating the discharging of the energy to the positive output after activating the discharging of the energy to the negative output.

14. The apparatus of claim 10, further comprising:
generating third PWM modulator, which generates a third control signal configured to be based on, at least, the first control signal and the second control signal;
wherein the controller is further configured to initiate a second discharging phase of discharging a third amount of energy accumulated in the SIBOBB simultaneously to both the positive output and the negative output in a buck-type or boost-type configuration of the SIBOBB, the second discharging phase being based on a monitoring of the first control signal, the second control signal and the third control signal simultaneously, the third amount of energy being controlled by a second duty cycle of the second control signal and a third duty cycle of the third control signal wherein the controller activates the charging phase before activating the second discharging phase.

15. The apparatus of claim 14, wherein the controller activates the second discharging phase before activating the first discharging phase.

16. The apparatus of claim 14, wherein the controller activates the second discharging phase after activating the first discharging phase.

17. The apparatus of claim 10, wherein the first and second comparison signals are saw-tooth signals or triangular signals.

18. A display integrated circuit comprising:
a display panel;
a Single Inductor Bipolar Output Buck-Boost converter, SIBOBB;
a processor; and,
an apparatus as defined in claim 10, wherein the display panel and the apparatus are controlled by the processor, the display panel is powered by the SIBOBB and the SIBOBB is controlled by the apparatus.

* * * * *